(12) United States Patent
Lee

(10) Patent No.: US 8,797,989 B2
(45) Date of Patent: Aug. 5, 2014

(54) METHOD AND APPARATUS FOR MANAGING RANDOM ACCESS PREAMBLE SET IN A WIRELESS COMMUNICATION SYSTEM WITH MULTIPLE RANDOM-ACCESS PRIORITY CLASSES

(75) Inventor: Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 13/554,768

(22) Filed: Jul. 20, 2012

(65) Prior Publication Data
US 2013/0021997 A1 Jan. 24, 2013

Related U.S. Application Data

(60) Provisional application No. 61/510,443, filed on Jul. 21, 2011, provisional application No. 61/552,429, filed on Oct. 27, 2011.

(30) Foreign Application Priority Data

Jul. 19, 2012 (WO) ................ PCT/KR2012/005762

(51) Int. Cl.
*H04W 4/00* (2009.01)
*H04W 74/08* (2009.01)

(52) U.S. Cl.
CPC .......... *H04W 74/0841* (2013.01); *H04W 4/005* (2013.01)
USPC ........... 370/329; 370/431; 370/436; 370/437; 370/443; 455/434; 455/450; 455/509; 455/515

(58) Field of Classification Search
None
See application file for complete search history.

(56) References Cited

U.S. PATENT DOCUMENTS

| | | | | |
|---|---|---|---|---|
| 2011/0134827 A1* | 6/2011 | Hooli et al. | .................... | 370/315 |
| 2011/0134862 A1* | 6/2011 | Huang et al. | .................. | 370/329 |
| 2011/0244907 A1* | 10/2011 | Golaup et al. | ................ | 455/509 |
| 2013/0223370 A1* | 8/2013 | Larmo et al. | .................... | 370/329 |

OTHER PUBLICATIONS

Ki-Dong Lee, "Througput Comparison of Random Access Methods for M2M Service over LTE Networks", Jul. 11, 2011, IEEE, pp. 373-377.*

(Continued)

*Primary Examiner* — Ian N Moore
*Assistant Examiner* — Latresa McCallum
(74) *Attorney, Agent, or Firm* — Birch, Stewart, Kolasch & Birch, LLP

(57) ABSTRACT

A method for determining a proper preamble allocation mode is provided. The method is applicable to a base station communication with a number of human to human UEs and machine to machine UEs. The base station collects information from different types of UEs to figure out arrival rates for human to human type random access attempts and machine to machine type random access attempts. The base station selects one allocation mode out of two different allocation modes. In one mode, random access preambles are dedicatedly allocated to machine to machine type UES. In the other mode, preambles are commonly allocated to different types of UEs. The base station indicates the selected allocation mode by using system information block such as SIB2.

12 Claims, 37 Drawing Sheets

(56) References Cited

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, V10.2.0 (Jun. 2011), 3 pages.
Ericsson et al., "Extended Access Barring for MTC Devices," 3GPP TSG-RAN WG2 #74, R2-113030, Agenda Item 4.3.1., May 9-13, 2011, Barcelona, Spain, 3 pages.
Institute for Information Industry (III) et al., "Dynamic Separate RACH Resources for MTC," 3GPP TSG RAN WG2 #74, R2-113328, Agenda Item 7.7, May 9-13, 2011, Barcelona, Spain, 5 pages.
LG Electronics Inc., "Discussion on RAN Overload Solution," 3GPP TSG-RAN WG2 #74, R2-113343, Agenda Item 4.3.1, May 9-11, 2011, Barcelona, Spain, 3 pages.

\* cited by examiner

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

Arrival rate of M2M RA attempts

METHOD AND APPARATUS FOR MANAGING RANDOM ACCESS PREAMBLE SET IN A WIRELESS COMMUNICATION SYSTEM WITH MULTIPLE RANDOM-ACCESS PRIORITY CLASSES

CROSS-REFERENCE TO RELATED APPLICATIONS

The present application for patent claims priority to Provisional Application Nos. 61/510,443 filed on Jul. 21, 2011 and 61/552,429 filed on Oct. 27, 2011, and International Application No. PCT/KR2012/005762 filed on Jul. 19, 2012, which are incorporated herein by reference.

BACKGROUND OF THE INVENTION

1. Field of the Invention

The technical features of this document relate to wireless communications using a number of orthogonal frequency division multiple (OFDM) symbols, and more particularly, to a method and apparatus for determining and allocation random access preambles in a wireless communication system associated with machine to machine (M2M) communication.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication is the communication between machines that do not necessarily need human intervention. The 3GPP has started an effort to determine potential network optimizations that could lower the operational costs associated with offering these new M2M services.

SUMMARY OF THE INVENTION

The technical features of this document provide a method of determining a random access preamble in a wireless communication system. The method is performed by a base station communicating with different types of UEs such as M2M UEs and H2H UEs.

In one aspect, the method comprises transmitting a first UE information request message to a first type user equipment (UE); receiving, in response to the first UE information request message, a first UE information response message from the first type UE, the first UE information response message indicating a number of preambles sent by the first type UE during a last successfully completed random access procedure; transmitting a second UE information request message to a second type user equipment (UE) different from the first type UE; receiving, in response to the second UE information request message, a second UE information response message from the second type UE, the second UE information response message indicating a number of preambles sent by the second type UE during a last successfully completed random access procedure; estimating a first arrival rate for the first type UE and a second arrival rate for the second type UE; determining a random access preamble allocation mode based on the first and second arrival rates, wherein available random access preamble allocation modes include a first allocation mode in which the random access preambles are allocated to the first type UE and the second type UE without overlap and a second allocation mode in which the random access preambles are allocated to the first type UE and the second type UE with partial overlap, wherein a number of random access preambles allocated to the first type UE and a number of random access preambles allocated to the second type UE are determined based on the first and second arrival rates; and broadcasting a radio resource control (RRC) message including a first information element and a second information element, wherein the first information element indicates the determined random access preamble allocation mode, and the second information element indicates the number of random access preambles allocated to the first type UE and the number of random access preambles allocated to the second type UE.

In the method, the first type UE is associated with human-to-human communication, and the second type UE is associated with machine-to-machine communication.

In the method, the RRC message is a system information block type 2 (SIB2).

In the method, the first and the second UE information request messages are transmitted by an RRC of the BS.

In the method, the first arrival rate is estimated based on a mean value of the number of preambles sent by the first type UE.

In the method, the first arrival rate is estimated further based on success probability of preamble transmission.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
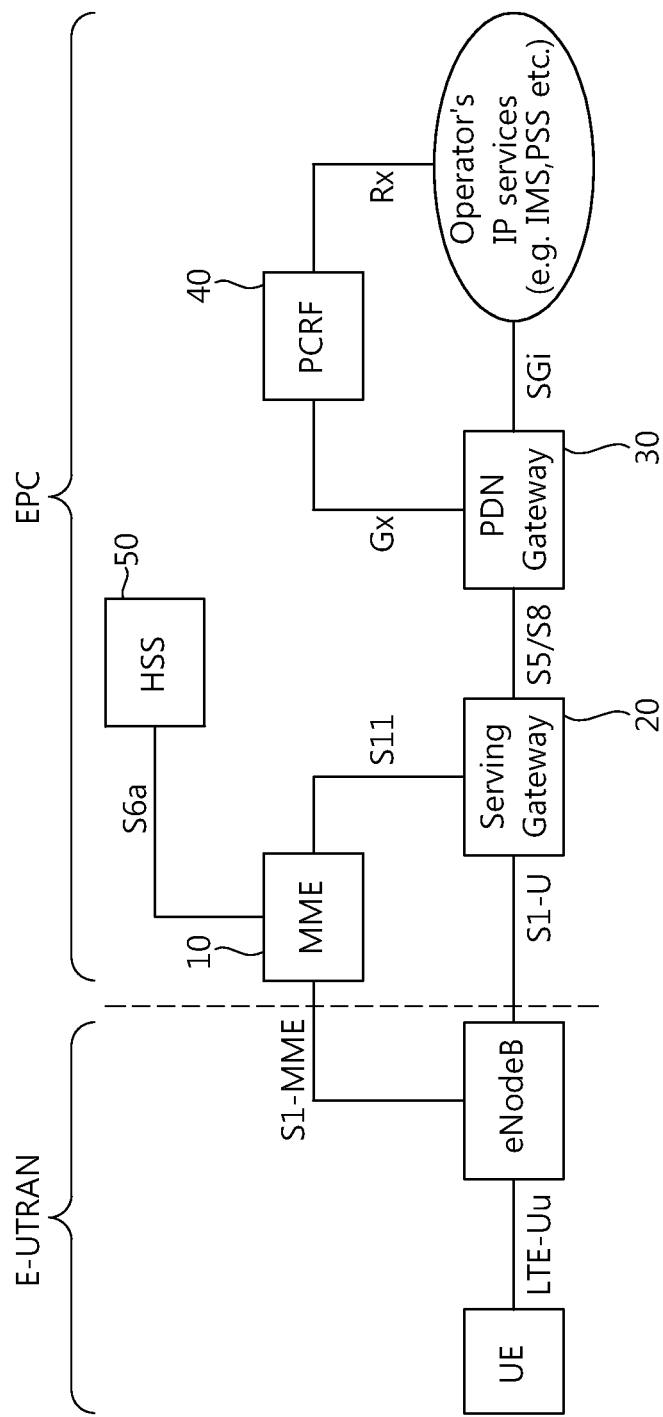
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 to includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits a paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
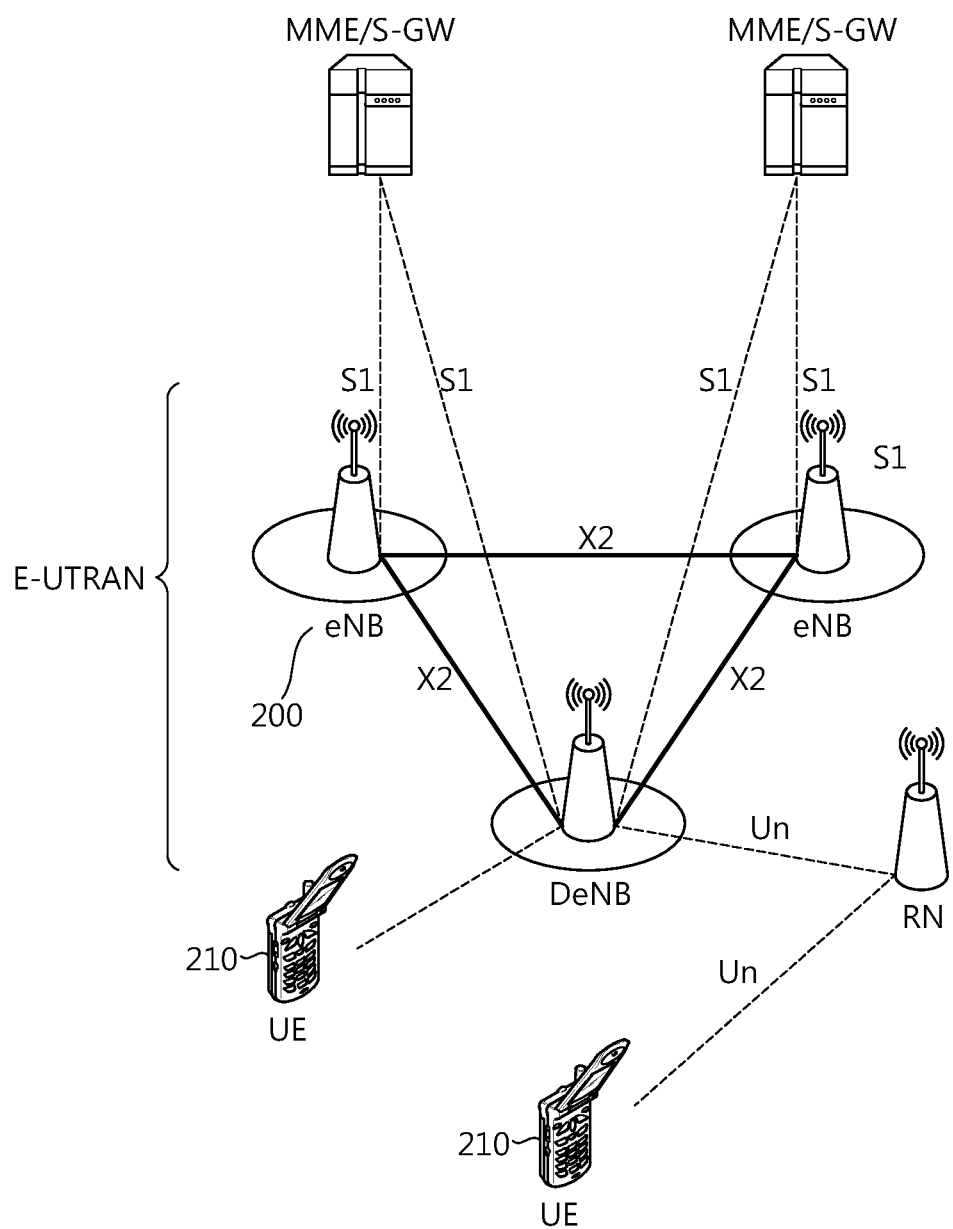
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MIME) by means of the S1-MIME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

The proposed method and apparatus are associated with machine to machine (M2M) communication. As discussed above, M2M communication is the communication between machines that do not necessarily need human intervention, and the 3GPP has started an effort to determine potential network optimizations. The M2M communication, which is also referred to as machine type communication (MTC), is expected to have applications in areas, such as smart metering, home automation, e-Health, fleet management, etc.

M2M communications have a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

In 3GPP LTE, the support of MTC (or M2M) nodes, or interchangeably delay-tolerant access or low priority access, requires very efficient operating mechanisms and protocols for the traffic channel and random access channel. Namely, it is one of the key issues in 3GPP LTE how to efficiently handle the heavy random access (RA) load caused by the huge population of MTC (or M2M) customers/devices.

The proposed method and apparatus propose two different mechanisms for allocating/managing RA preambles. The first mechanism, Method 1, is to completely split the set of available RA preambles into two disjoint subsets: one is for human-to-human (H2H) communication and the other for M2M communication. The second mechanism, Method 2, is also to split the set into two subsets: one is for H2H customers only whereas the other is for both H2H and M2M. Accordingly, in Method 1, each of the RA preambles is exclusively allocated to only one of H2H and M2M communication. However, in Method 2, RA preambles are allocated to H21-1 and M2M communication with overlap One of the main characteristics of M2M communication is relatively high fixed cost for communication. This is caused by a characteristic of the M2M node that higher frequency of data transmission than H2H communication. Although the amount of data handled by the M2M node is small, the frequency of data connections is higher than H2H due to the M2M node's specific roles and functions.

Therefore, given the situation where huge population of M2M nodes are attaching to the network, one of the most important design considerations in M2M service networks is how to design an efficient method for handling the random access load.

In this description at least two possible methods or mechanisms for RA preamble allocation and management are proposed. Based on Method 1, it is preferred to completely split the set of available RA preambles into two disjoint subsets: one is for H2H customers and the other for M2M customers/devices. Based on Method 2, it is preferred to split the set into two subsets: one is for H2H customers only whereas the other is for both H2H and M2M customers.

Hereinafter, the random access procedure is explained. The random access procedure can be initiated with an Access Class (AC) barring. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring timer value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
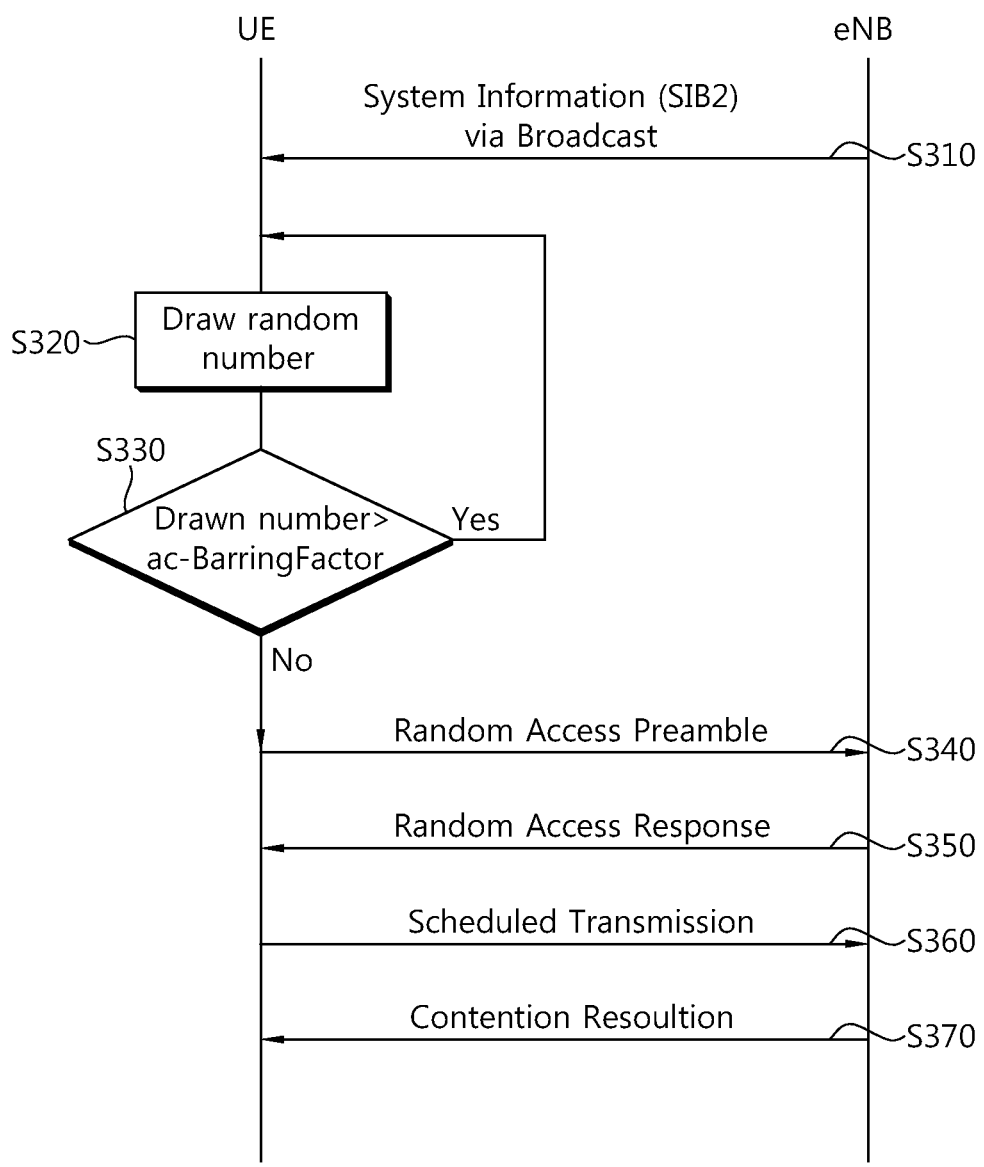
FIG. 3 is a flow diagram showing a random access procedure which is used for an embodiment of the proposed method.

FIG. 3 is a flow diagram showing a random access procedure which is used for an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

Referring to FIG. 3, in step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

Referring to FIG. 3, in step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. The random access response includes information on a back-off time. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to the radio resource allocation information included in the random access response. The scheduled message, which is also referred to as a message 3, may include a radio resource control (RRC) connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

The random access procedure can be understood in view of arrival rates. The arrival rate represents the number of preambles transmitted by a certain type of UEs (e.g., H2H or M2M UEs) during a certain period of time (i.e., unit time). Alternatively, the arrival rate may represent the number of packets arrived at a certain network entity during a unit time. Further, while the arrival rate can be defined in various phases of the random access (RA) procedure, the arrival rate of RA attempts in the present description is not the rate of original RA attempts (that is associated with offered load) but the rate of RA attempts passed through the access-class (AC) barring procedure (that is associated with arrived or carried load) disclosed in steps S320-330 of FIG. 3. For instance, if the rate of original RA attempts is set to '100' with an 'ac-BarringFactor' of '0.5', the average observed rate of RA attempts in the present description is set to around 50.

Further, the random access procedure can be understood in view of random access channel (RACH) opportunities. The RACH opportunities can be defined as a 3-domensional radio block on a time-frequency domain with a fixed number of preambles. A random access radio network temporary identity (RA-RNTI) defined in the time-frequency domain is a time-frequency block. The number of RA-RNTI per unit time is denoted by a variable R, which is assumed to be '1' in the present description.

The present description provides a number of mechanisms for allocating/managing RA preambles. The number of available RA preambles proposed by the present description can be denoted by a number N. Then the total number of available RACH opportunities can be defined by 'R*N'.

As discussed above, present description proposes two different mechanisms, i.e., Method 1 and Method 2, to allocate RA preambles for H2H and M2M communication. In Method 1 (or the $1^{st}$ allocation mode), all preambles available for contention-based RA are separated into two subsets, where one set of preambles are dedicatedly used by H2H communication/services (e.g., H2H UEs) whereas the other set of preambles are used by M2M communication/services (e.g., M2M UEs). In Method 1, preambles for contention-free RA can be further used.

Figure 4:
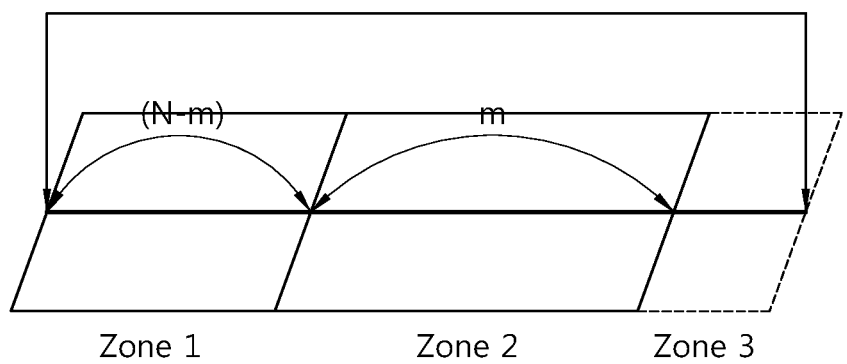
FIG. 4 is a diagram illustrating a preamble allocation method according to the present description.

FIG. 4 is a diagram illustrating a preamble allocation method according to Method 1. Referring to FIG. 4, an N number of RA preambles are available for contention-based RA. Among them, an m number of RA preambles (illustrated by Zone 2 of FIG. 4) are dedicatedly allocated to M2M UEs whereas an N-m number of RA preambles (illustrated by Zone 1 of FIG. 4) are dedicatedly allocated to H2H UEs. Accordingly, in Method 1, RA preambles for Zone 1 and Zone 2 are allocated without overlap. Further, as discussed above, RA preambles for contention-free RA (illustrated by Zone 3 of FIG. 4) can be further allocated.

Figure 5:
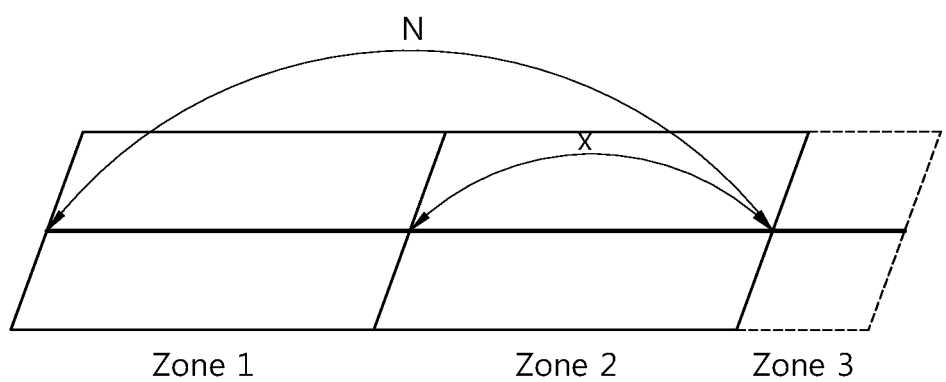
FIG. 5 is a diagram illustrating a preamble allocation method according to the present description.

FIG. 5 is a diagram illustrating a preamble allocation method according to Method 2. Referring to FIG. 5, an N number of RA preambles are available for contention-based RA. Among them, an x number of RA preambles (illustrated by Zone 2 of FIG. 5) are allocated to both M2M UEs and H2H UEs whereas an N-x number of RA preambles (illustrated by Zone 1 of FIG. 5) are dedicatedly allocated to H2H UEs. Accordingly, in Method 1, RA preambles for Zone 1 and Zone 2 are allocated with partial overlap. Further, as discussed above, RA preambles for contention-free RA (illustrated by Zone 3 of FIG. 5) can be further allocated.

The present description proposes a base station instructing a UE to select a RA preamble according to a random access (RA) preamble allocation mode, which is one of the $1^{st}$ allocation mode (i.e., Method 1) and the $2^{nd}$ allocation mode (i.e., Method 2). Once the allocation mode is determined, the UE will select one RA preamble out of available preambles. For instance, if the UE is a M2M UE performing contention-based RA, and the $1^{st}$ allocation mode is instructed, the UE will select its RA preamble among an m number of RA preambles.

In order for the eNB to determine a proper RA preamble allocation mode, it is preferred that the eNB should estimate an arrival rate of RA attempts (associated with the aforementioned arrived load). In order to estimate an arrival rate, information on the number of preambles sent by UEs during the last successfully completed random access procedure is collected. In more detail, it is preferred that the eNB should receive information on the number of preambles transmitted during the last successfully completed random access procedure to estimate an arrival rate. Further, it is more preferred that the eNB should estimate arrival rates for the H2H RA attempts and the M2M RA attempts. The arrival rate for the H2H RA attempts can be estimated based on the number RA preambles sent by H2H UEs, whereas the arrival rate for the M2M RA attempts can be estimated based on the number RA preambles sent by M2M UEs.

Figure 6:
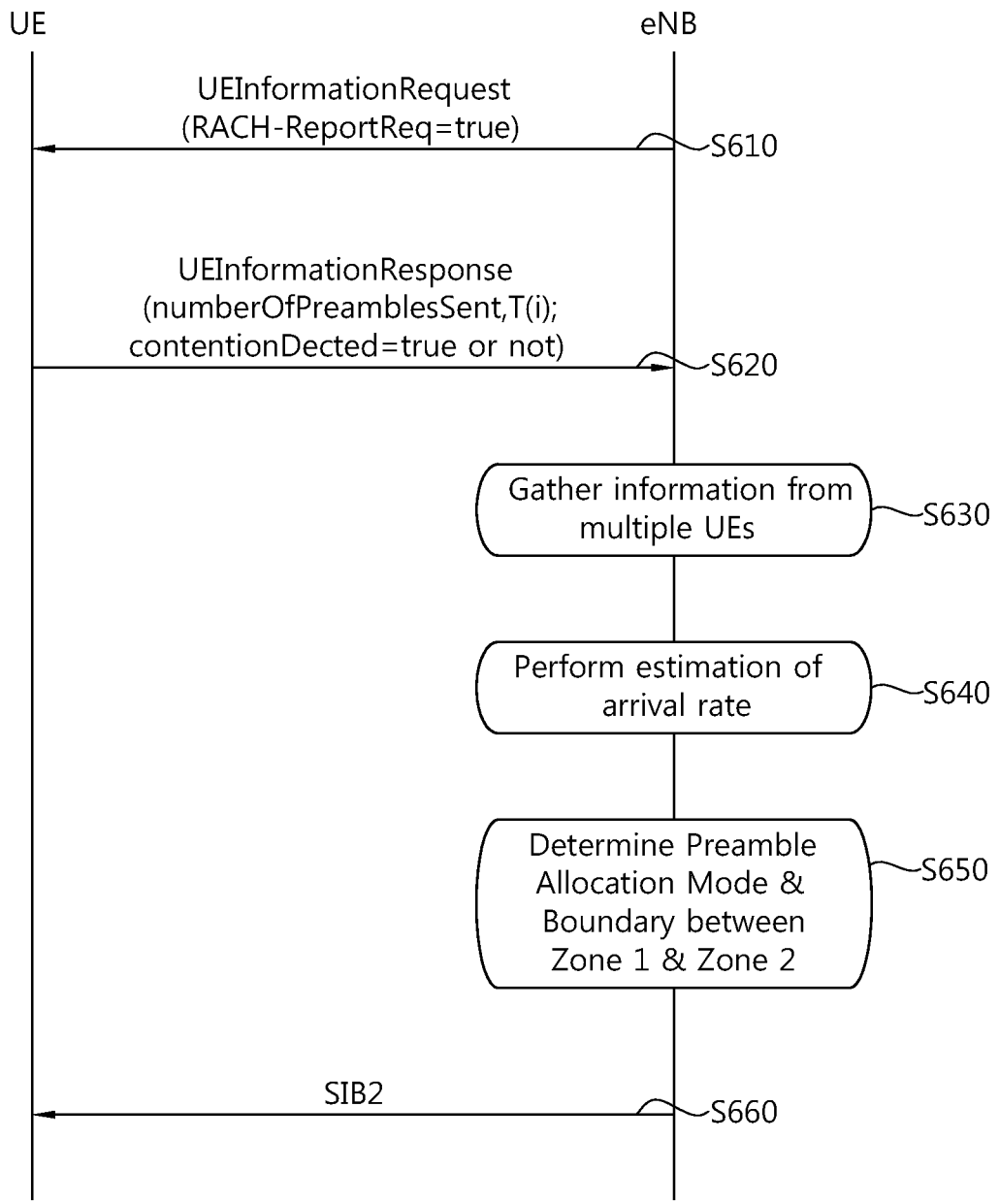
FIG. 6 is a flowchart illustrating a method of instructing a RA preamble allocation mode to the UE.

FIG. 6 is a flowchart illustrating a method of instructing a RA preamble allocation mode to the UE. Referring to FIG. 6, in step S610, the eNB transmits an RRC message including a 'UEInformationRequest' message with a 'Rack-ReportReq' field set to 'true' to acquire information on the number RA preambles sent by a certain UE. In response to the 'UEInformationRequest' message, in step S620, the UE transmits an RRC message of a 'UEInformationResponse' message including a 'numberOfPreamblesSentT(i)' field, which indicates the number of preambles sent by the certain UE. Further, the 'UEInformationResponse' message may indicate whether contention was detected during the previous RA procedure.

The steps S610-S620 can be repeatedly performed so that the eNB obtains information from different types of UEs. By doing so, in step S630, the eNB gathers information T(i) representing the number of preambles sent by multiple UEs.

In step S640, the eNB performs estimation of an arrival rate. A though various algorithms of estimating the arrival rate are available, one example of estimating an arrival rate is based on an arithmetic mean of T(i), success probability of preamble transmission, and Poisson assumption. In particular, the eNB calculates an arithmetic mean of T(i), i.e., $T=\{T(1)+T(2)+\ldots T(n)\}/n$, where n denotes the number of UEs. Assuming that 'success probability of preamble transmission' is determined by $T=1/p$ where p denotes the success probability of preamble transmission, the arrival rate of RA attempts/preamble transmission which is denoted by L can be calculated from Poisson assumption as in $p=L*\exp(-L)$.

Figure 7:
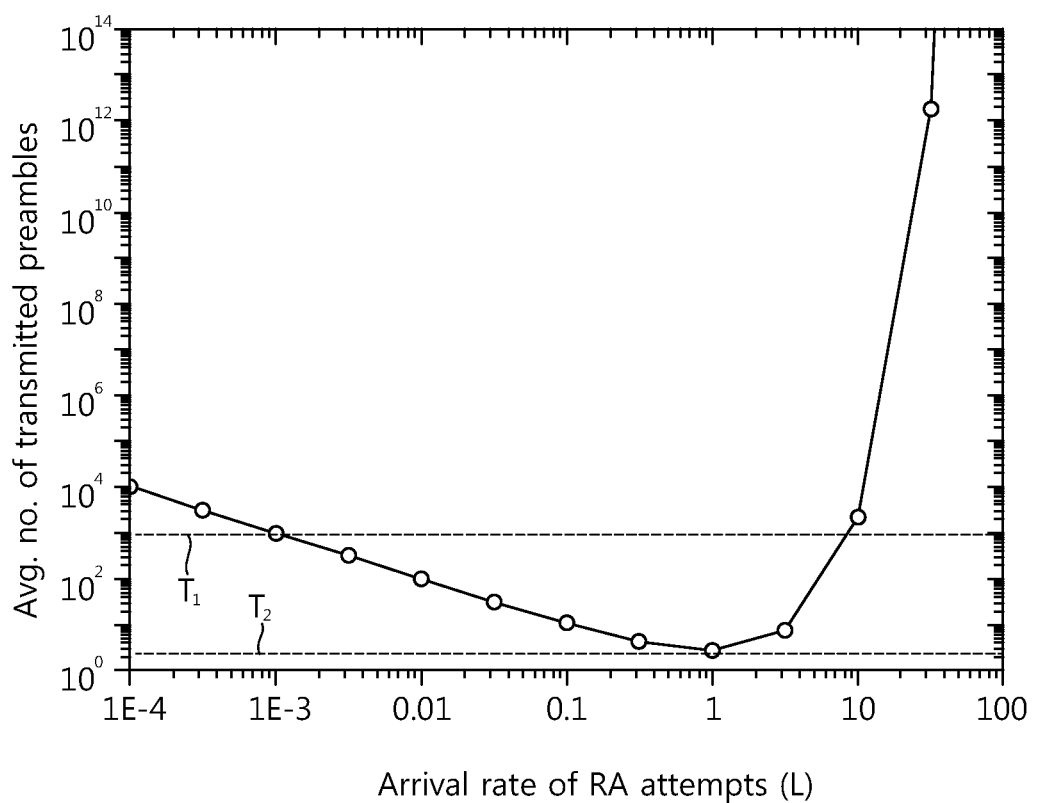
FIG. 7 illustrates relationship between an arrival rate of RA attempts and arithmetic mean of T(i).
Figure 8:
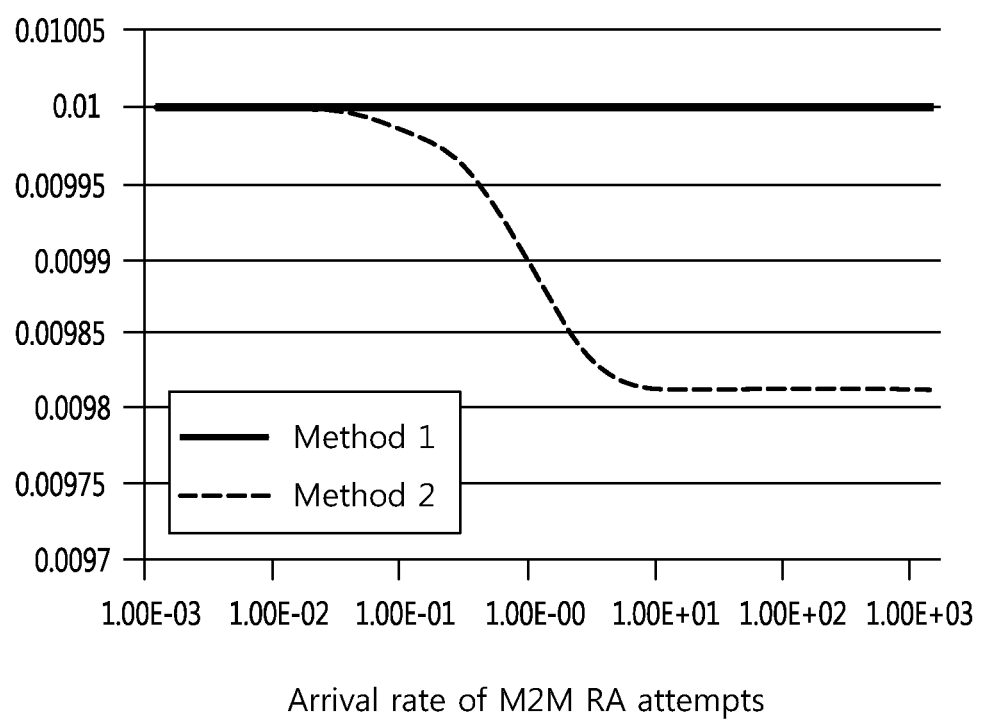
FIG. 8 illustrates RACH throughput of Method 1 and Method 2 when arrival rate of H2H RA attempts is set to 0.01.
Figure 9:
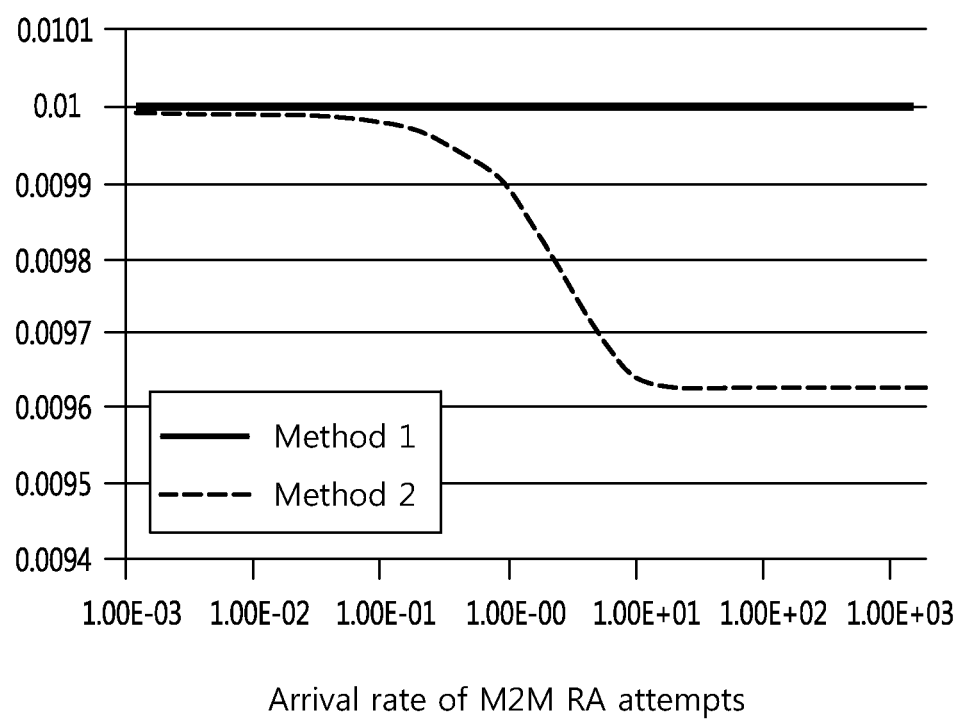
FIG. 9 illustrates another RACH throughput of Method 1 and Method 2 when arrival rate of H2H RA attempts is set to 0.01.
Figure 10:
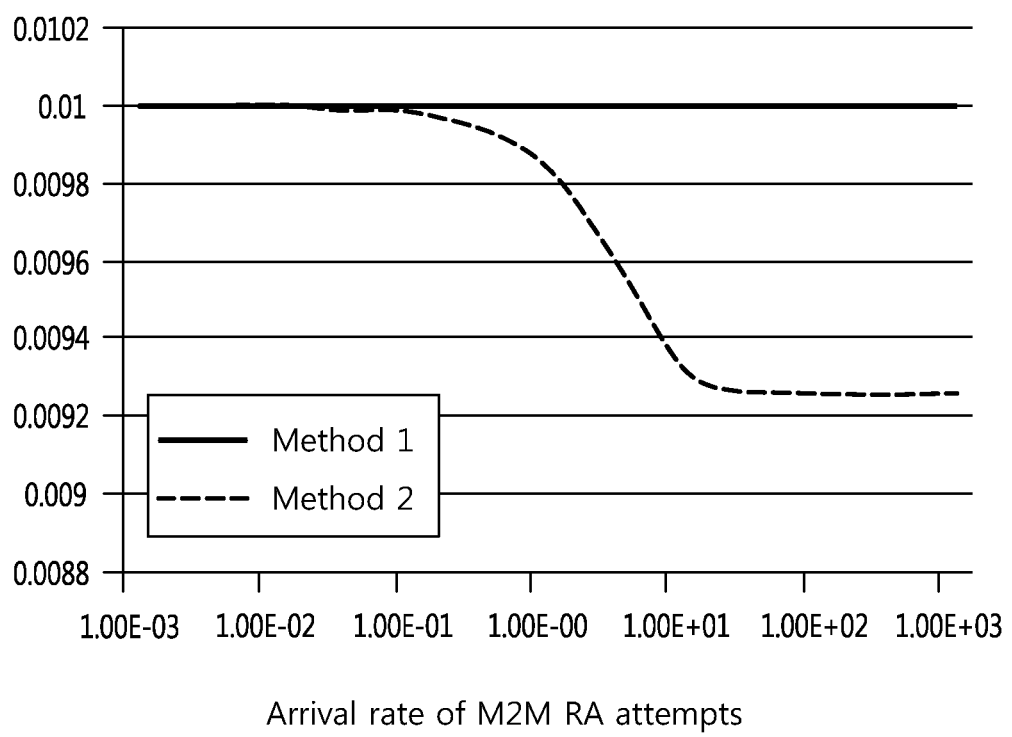
FIG. 10 illustrates another RACH throughput of Method 1 and Method 2 when arrival rate of H2H RA attempts is set to 0.01.
Figure 11:
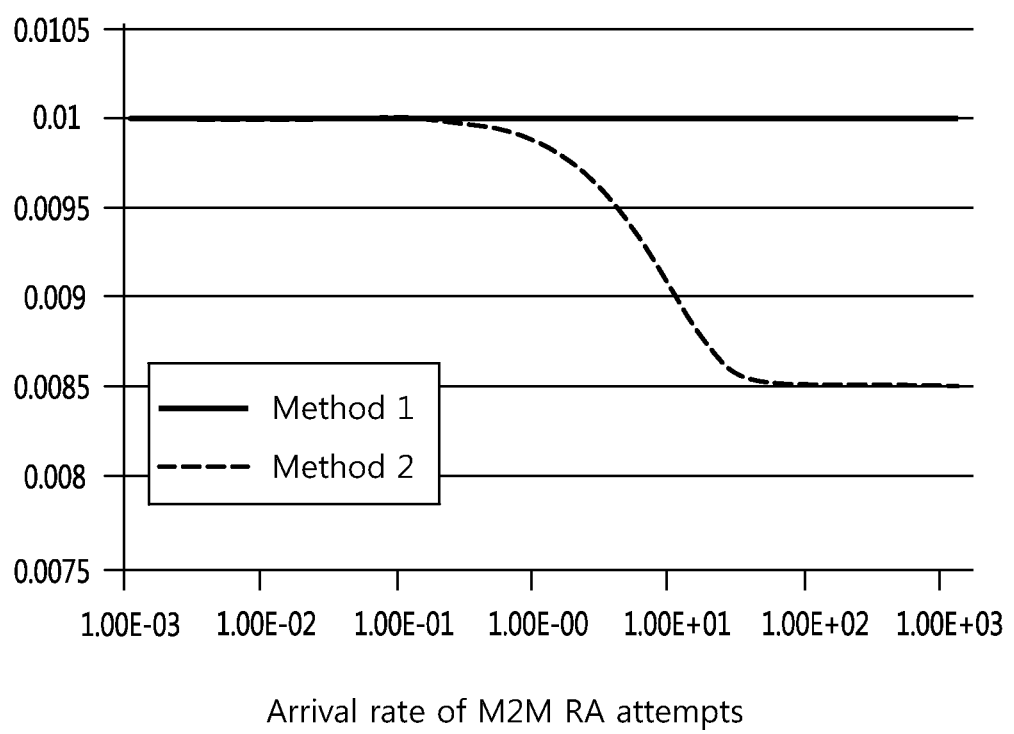
FIG. 11 illustrates another RACH throughput of Method 1 and Method 2 when arrival rate of H2H RA attempts is set to 0.01.
Figure 12:
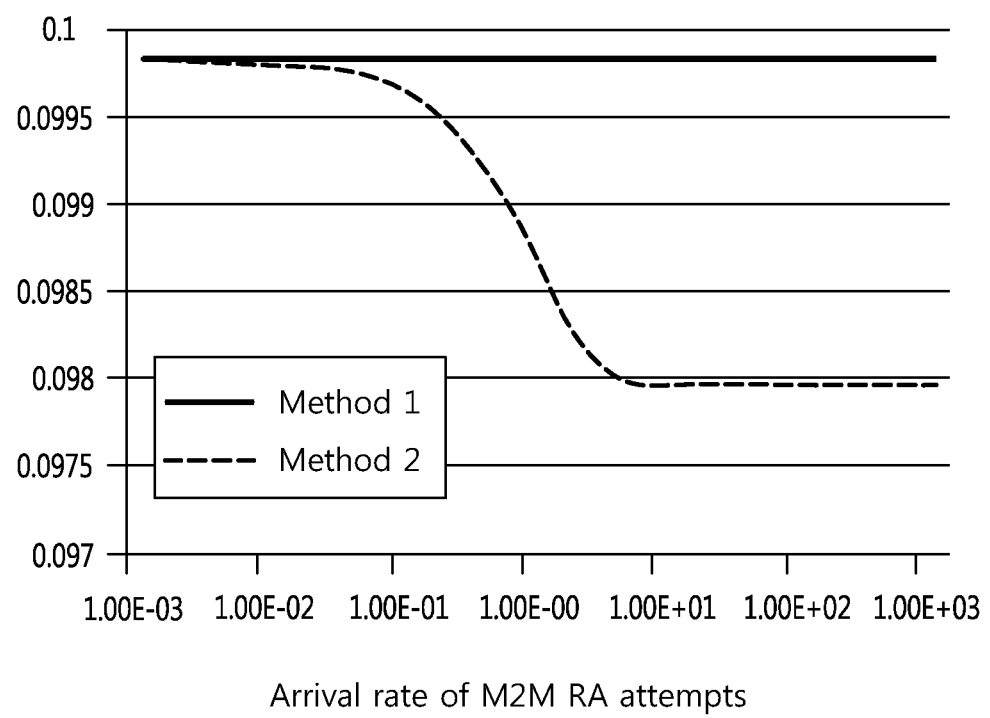
FIG. 12 illustrates RACH throughput of Method 1 and Method 2 when arrival rate of H2H RA attempts is set to 0.1.
Figure 13:
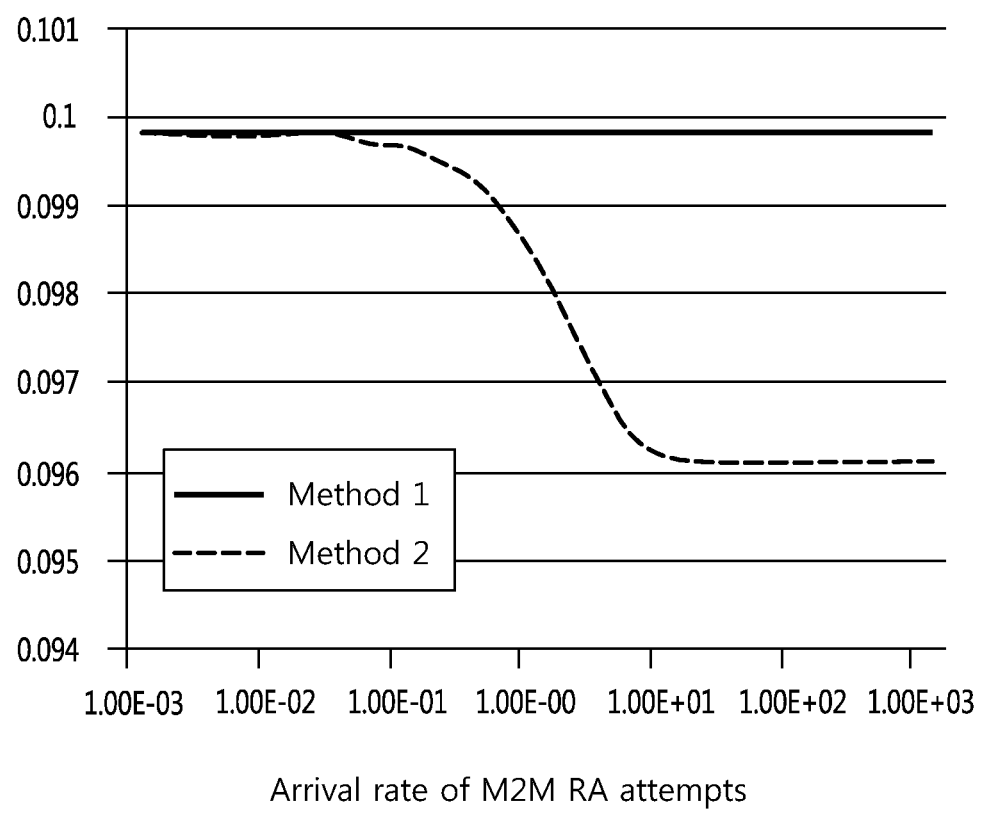
FIG. 13 illustrates another RACH throughput of Method 1 and Method 2 when arrival rate of H2H RA attempts is set to 0.1.
Figure 14:
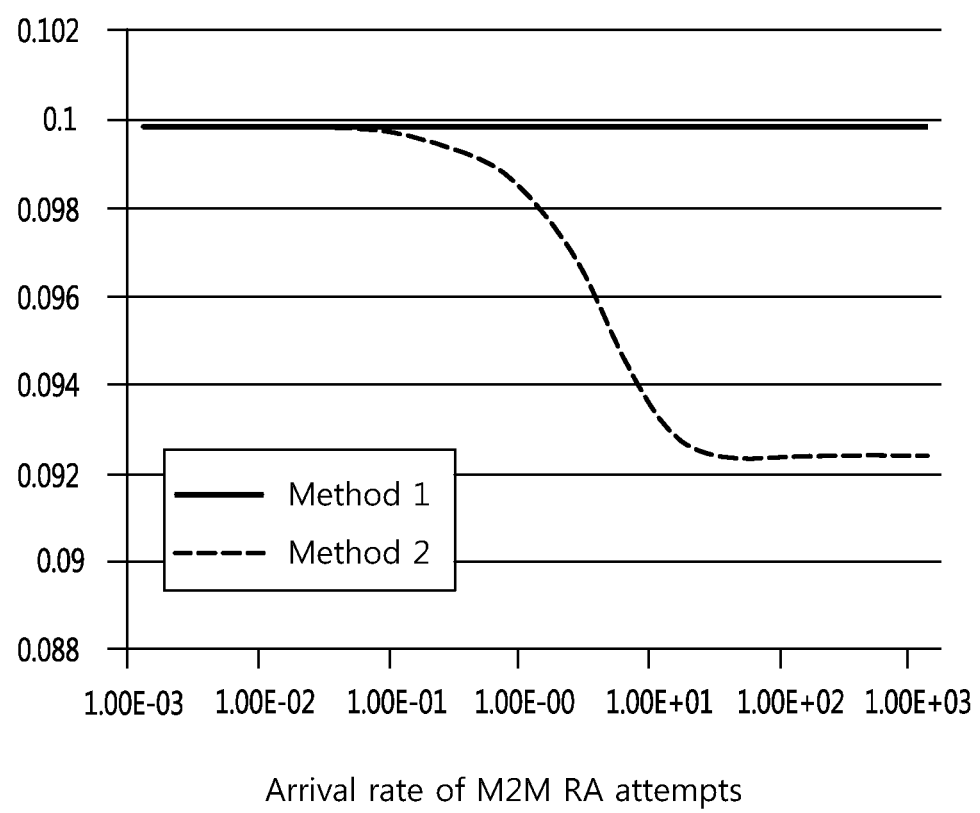
FIG. 14 illustrates another RACH throughput of Method 1 and Method 2 when arrival rate of H2H RA attempts is set to 0.1.
Figure 15:
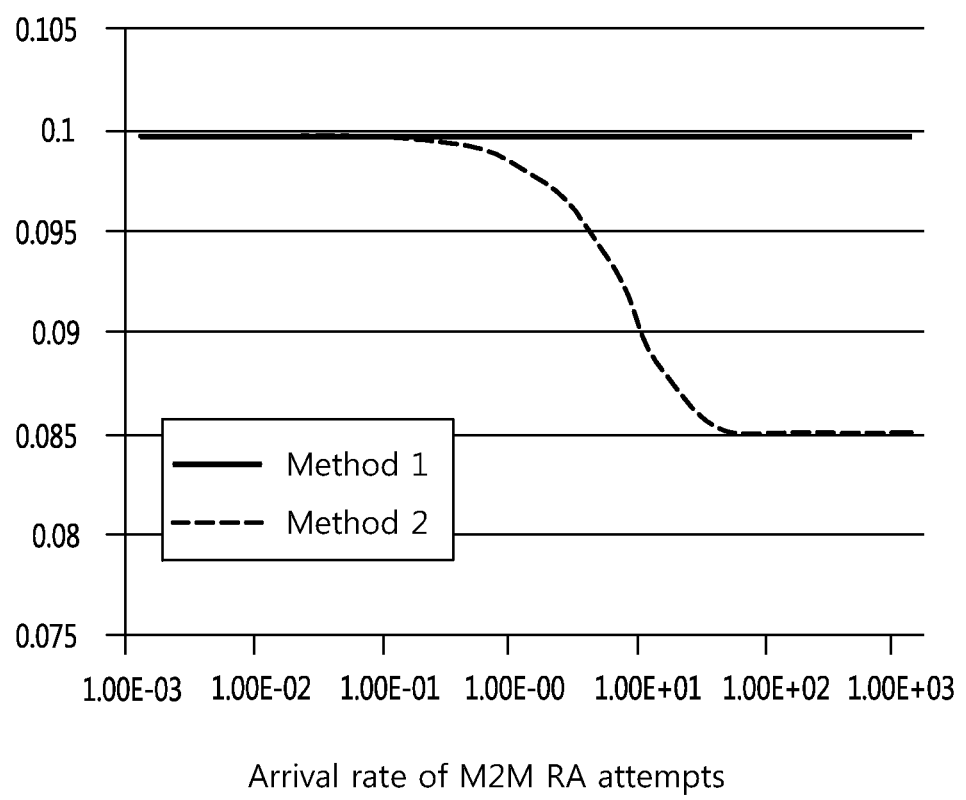
FIG. 15 illustrates another RACH throughput of Method 1 and Method 2 when arrival rate of 11211 RA attempts is set to 0.1.
Figure 16:
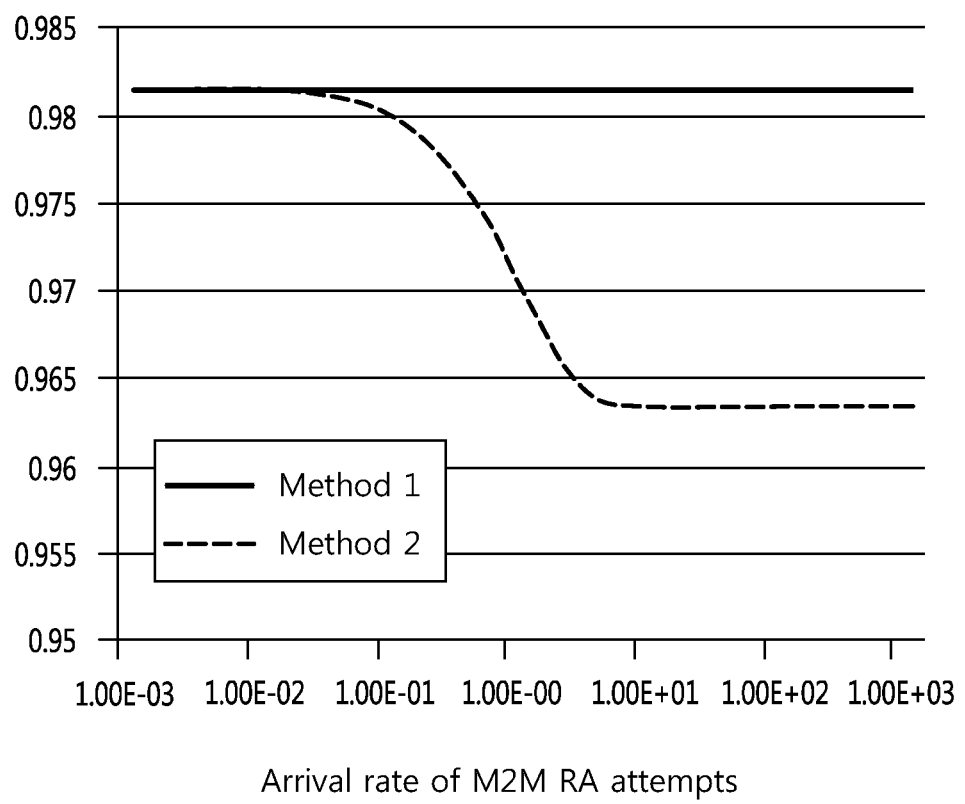
FIG. 16 illustrates RACH throughput of Method 1 and Method 2 when arrival rate of H2H RA attempts is set to 1.
Figure 17:
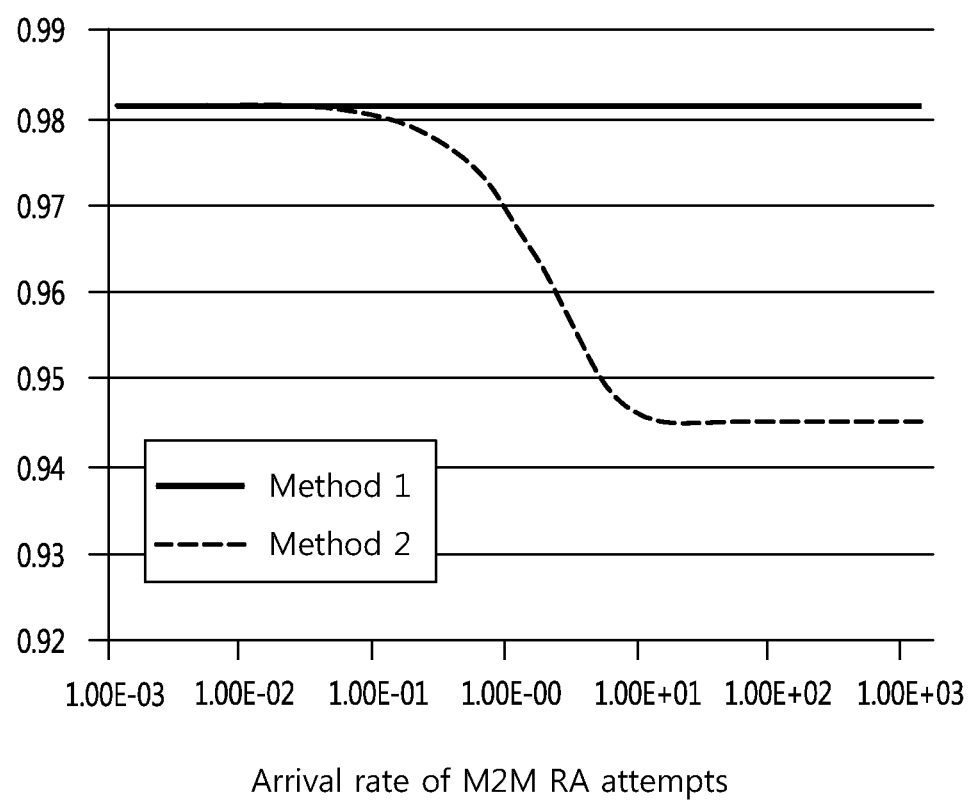
FIG. 17 illustrates another RACH throughput of Method 1 and Method 2 when arrival rate of H2H RA attempts is set to 1.
Figure 18:
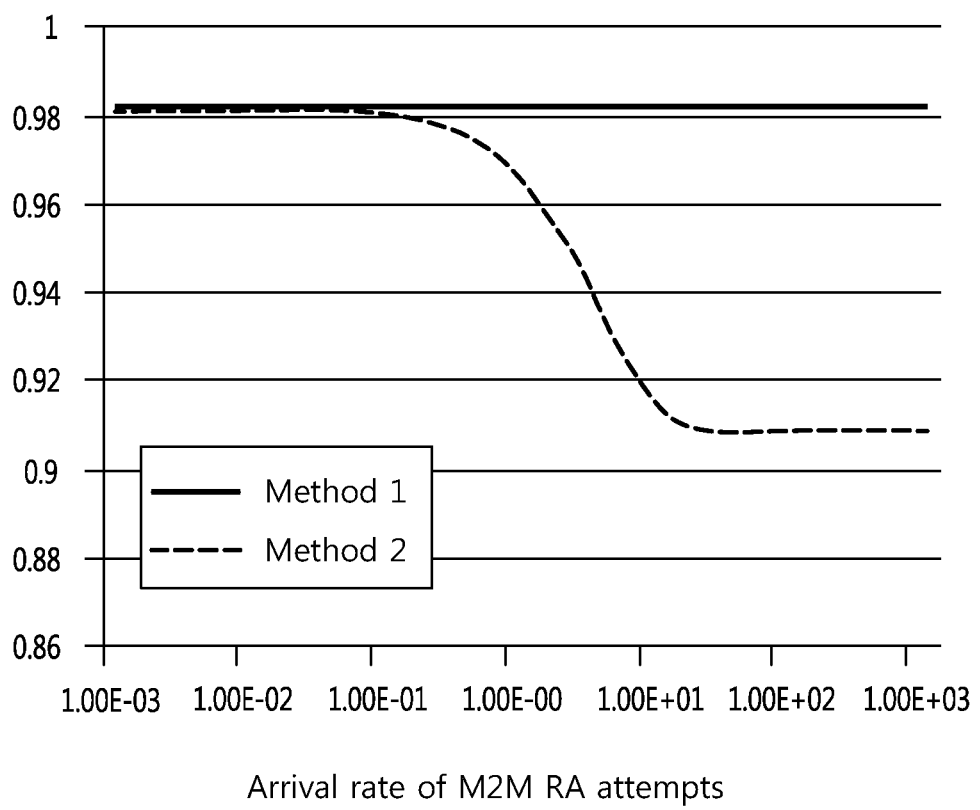
FIG. 18 illustrates another RACH throughput of Method 1 and Method 2 when arrival rate of H2H RA attempts is set to 1.
Figure 19:
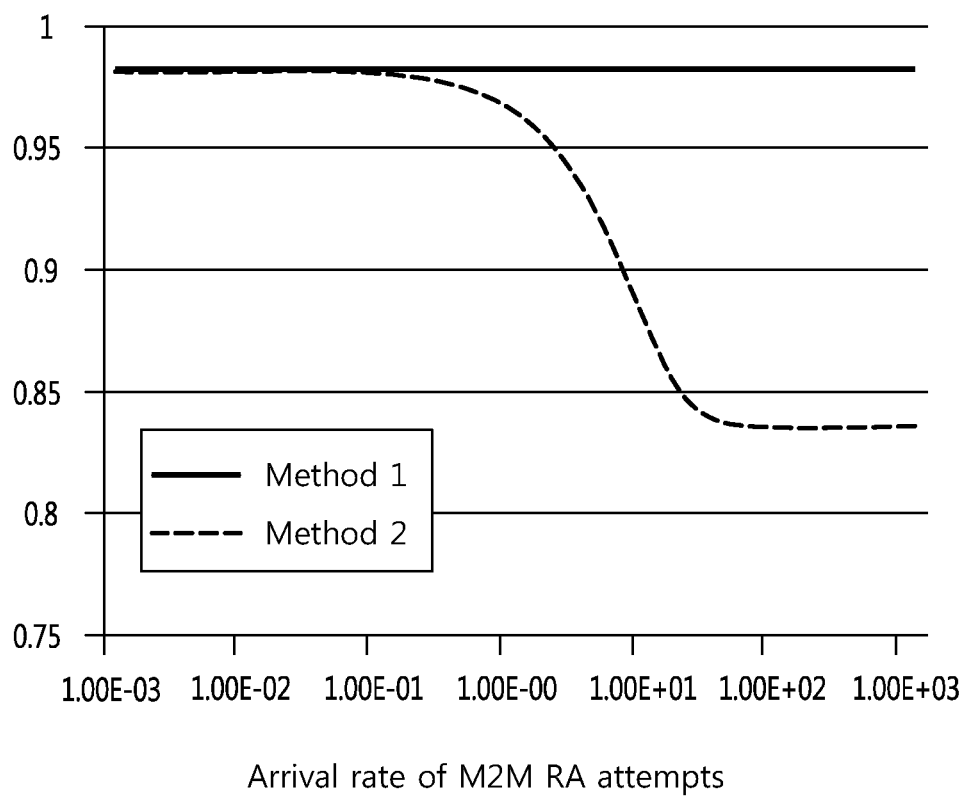
FIG. 19 illustrates another RACH throughput of Method 1 and Method 2 when arrival rate of H2H RA attempts is set to 1.
Figure 20:
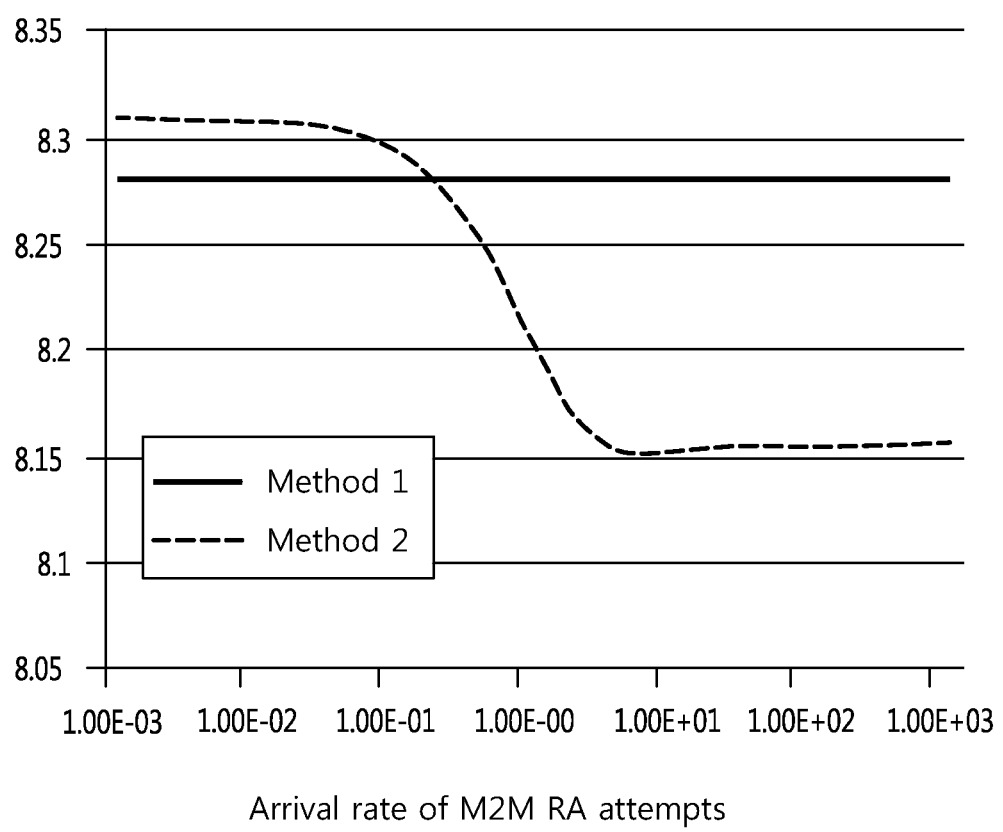
FIG. 20 illustrates RACH throughput of Method 1 and Method 2 when arrival rate of H2H RA attempts is set to 10.
Figure 21:
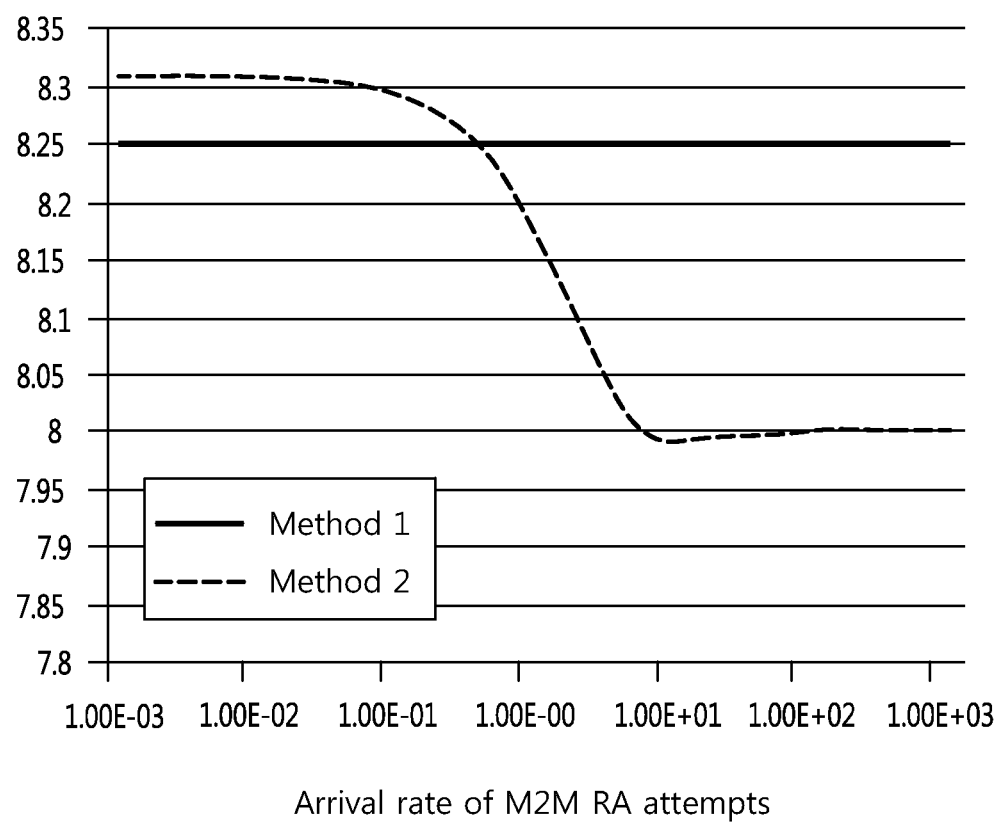
FIG. 21 illustrates another RACH throughput of Method 1 and Method 2 when arrival rate of H2H RA attempts is set to 10.
Figure 22:
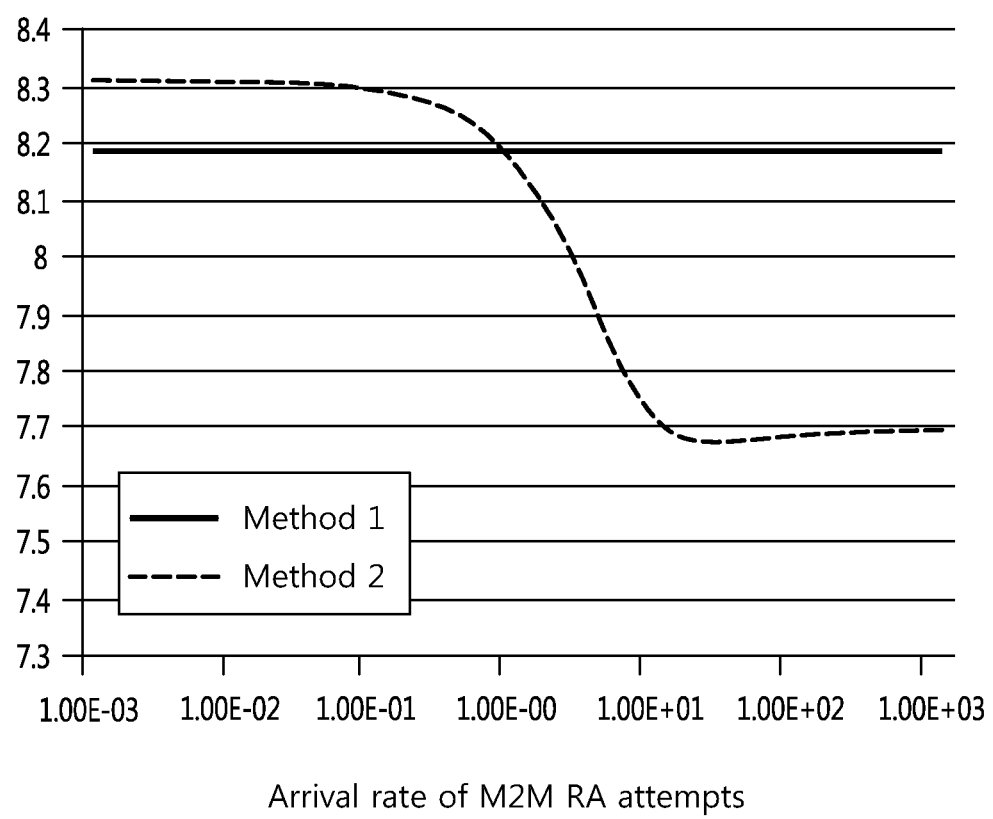
FIG. 22 illustrates another RACH throughput of Method 1 and Method 2 when arrival rate of H2H RA attempts is set to 10.
Figure 23:
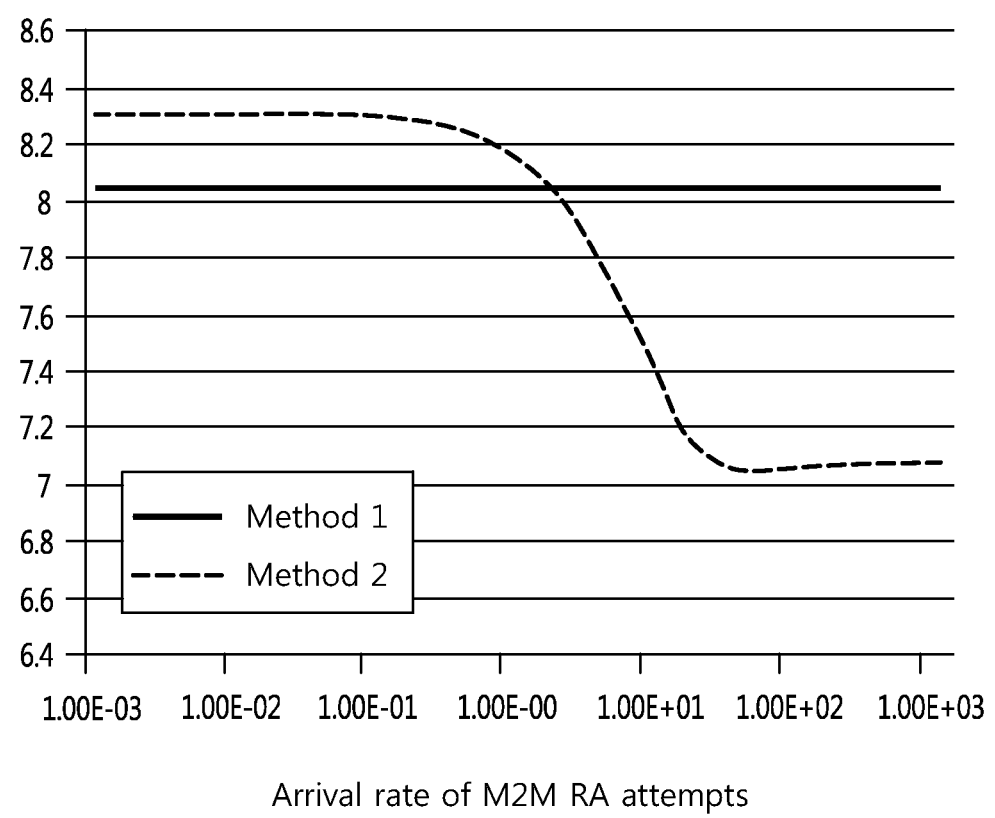
FIG. 23 illustrates another RACH throughput of Method 1 and Method 2 when arrival rate of H2H RA attempts is set to 10.

FIG. 7 illustrates the relationship between the arrival rate of RA attempts and the arithmetic mean of T(i). Once the arithmetic mean of T(i) is determined, available arrival rates are determined based on the relationship depicted in FIG. 7. As shown in FIG. 7, the maximum number of solutions for the arrival rate L can be 2. If there is no solution for the arrival rate L, the eNB may maintain the previous RA preamble allocation mode and further obtain UE information from UEs. If the arithmetic mean of T(i) is set to $T_2$, there is a unique solution for the arrival rate L. Further, if the arithmetic mean of T(i) is set to $T_1$, there are two possible solutions for the arrival rate L. In a case where there are two possible solutions, the eNB may select a proper arrival rate among two possible candidates by comparing two different RACH throughputs with respect to the two arrival rates. Namely, the UE may estimate the first RACH throughput for the first solution of the arrival rate L and the second RACH throughput for the second solution of the arrival rate L, and thereafter determine a proper arrival rate by comparing two RACH throughputs.

In step S640, it is preferred that the eNB should estimate arrival rates for H2H and M2M UEs separately. To estimate arrival rates for two different types of UEs, the eNB may calculate one arithmetic mean of T(i) of H2H UEs and the other arithmetic mean of T(i) of M2M UEs. By doing so, the eNB obtains one arrival rate for H2H UEs and the other arrival rate for M2M UEs.

In step S650, the eNB determines a RA preamble allocation mode, which is one of the aforementioned Method 1 and Method 2. In step S650, the RA preamble allocation mode can be selected based on RACH throughput, which is estimated by the arrival rates of H2H and M2M UEs. For instance, given parameters related to RA attempts (e.g., the arrival rates and the number of preambles allocated for a certain type of UE), if RACH throughput of Method 1 estimated to be greater than that of Method 2, the eNB selects Method 1 as a proper RA preamble allocation mode.

When determining the RA preamble allocation mode, the number of RA preambles allocated for a certain type of UEs is further determined in step S650. For instance, when Method 1 is selected by the eNB, the number of RA preambles dedicatedly used for M2M UEs and the number of RA preambles dedicatedly used for H2H UEs are further determined. When Method 2 is selected, the number of RA preambles commonly used for M2M and H2H UEs and the number of RA preambles dedicatedly used for H2H UEs are further determined.

As discussed above, the RA preamble allocation mode can be selected based on RACH throughput. The RACH throughput is affected by various variables such as arrival rates, the number of preambles, etc. It is preferred that the eNB should estimate the relationship between the RACH throughput and the various variables to determine a proper RA preamble allocation mode. In particular, it is preferred that the eNB which has determined arrival rates should estimate the relationship between the RACH throughput and the number of preambles, and thereafter select Method 1 or Method 2 together with the optimal number of preambles used for the selected method.

Hereinafter, the relationship between the RACH throughput and the number of preambles when arrival rates for H2H and M2M have been given is explained in detail. FIGS. 8-29 illustrate RACH throughput of Method 1 and Method 2 in predetermined circumstances. FIGS. 8-29 compare RACH throughput of Method 1 (depicted by a solid line) and Method 2 (depicted by a dotted line). In particular, FIGS. 8-11 illustrate examples where an arrival rate of H2H UEs' RA attempts is set to 0.01. A variable m indicating the number of preambles used for M2M UEs in Method 1 is set to 1, 2, 4 and 8 in FIGS. 8, 9, 10 and 11, respectively.

FIGS. 12-15 illustrate examples where an arrival rate of H2H UEs' RA attempts is set to 0.1. A variable m indicating the number of preambles used for M2M UEs in Method 1 is set to 1, 2, 4 and 8 in FIGS. 12, 13, 14 and 15, respectively.

FIGS. 16-19 illustrate RACH throughput where an arrival rate of H2H UEs' RA attempts is set to 1. A variable m indicating the number of preambles used for M2M UEs in Method 1 is set to 1, 2, 4 and 8 in FIGS. 16, 17, 18 and 19, respectively.

In each example, a variable x indicating the number of preambles commonly used for H2H and M2M UEs in Method 2 is determined to correspond to the variable m used for M2M UEs in Method 1 such that M2M UEs in Method 2 experience the same level of throughput as M2M UEs in Method 1. Generally, the variable x is determined to be greater than the variable m. More detailed features related to determining the variable x and RACH throughput will be explained in the following Equations 1-16.

FIGS. 8-19 demonstrate that Method 2 provides negligibly small amount better than Method 1 when the arrival rate of M2M RA attempts is small but that Method 2 may significantly degrade the throughput in comparison to Method 1. Accordingly, Method 1 can be generally chosen as a proper RA preamble allocation mode when the arrival rate of H2H RA attempts is smaller than 2% of the number of available RACH opportunities.

FIGS. 20-23 illustrate RACH throughput where an arrival rate of H2H UEs' RA attempts is set to 10. In particular, a variable m indicating the number of preambles used for M2M UEs in Method 1 is set to 1, 2, 4 and 8 in FIGS. 20, 21, 22 and 23, respectively.

Figure 24:
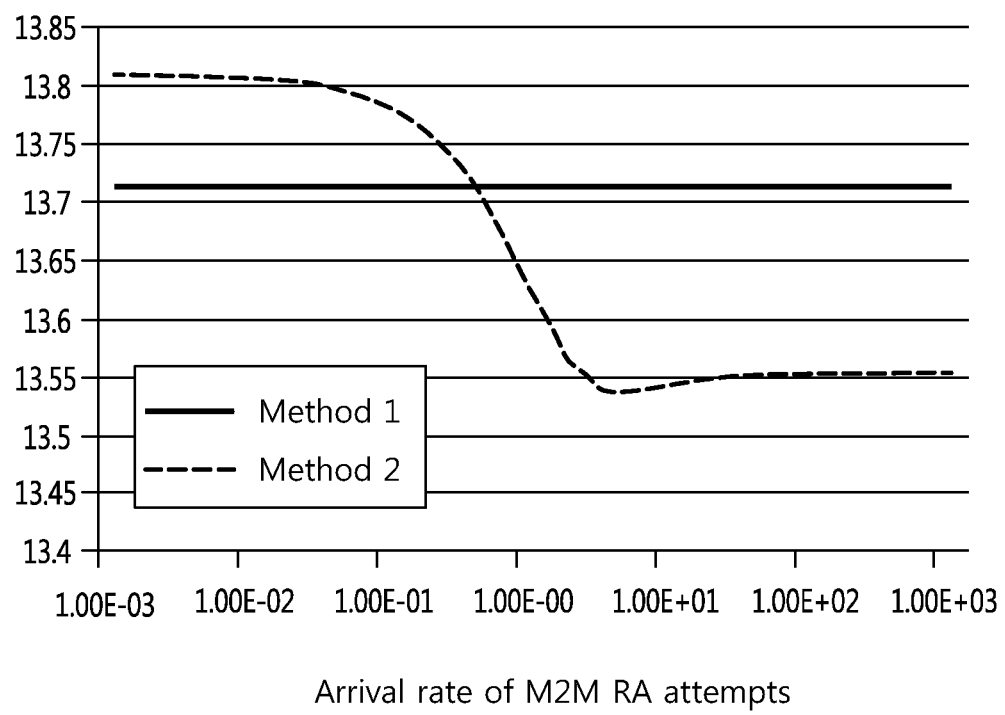
FIG. 24 illustrates RACH throughput of Method 1 and Method 2 when arrival rate of H2H RA attempts is set to 20.
Figure 25:
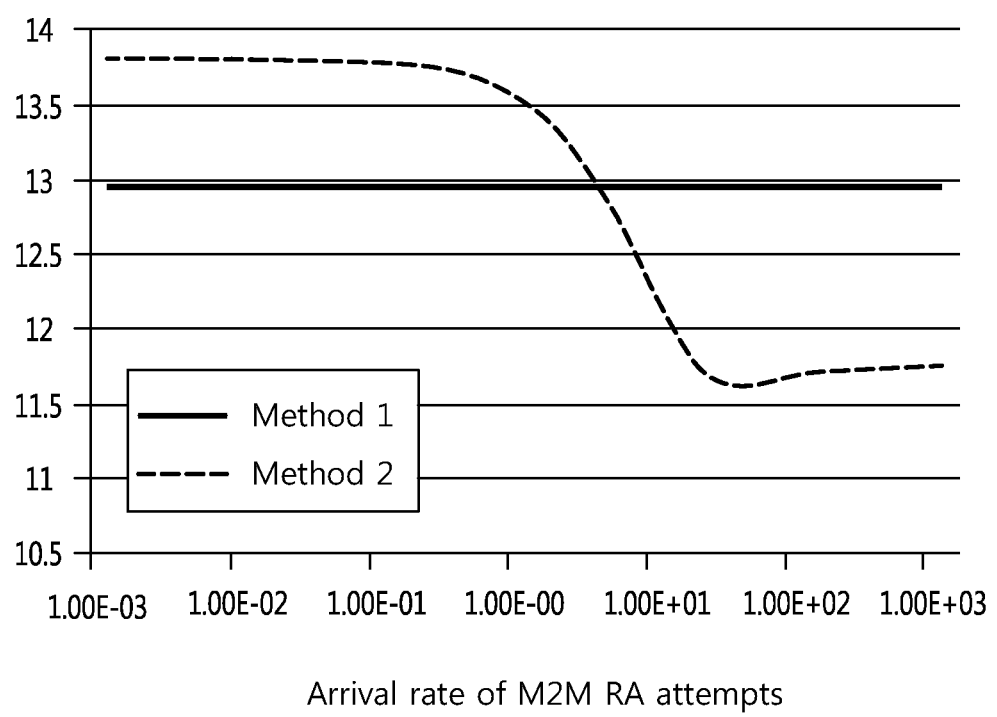
FIG. 25 illustrates another RACH throughput of Method 1 and Method 2 when arrival rate of H2H RA attempts is set to 20.

FIGS. 24-25 illustrate RACH throughput where an arrival rate of H2H UEs' RA attempts is set to 20. A variable m indicating the number of preambles used for M2M UEs in Method 1 is set to 1 and 8 in FIGS. 24 and 25, respectively.

Figure 26:
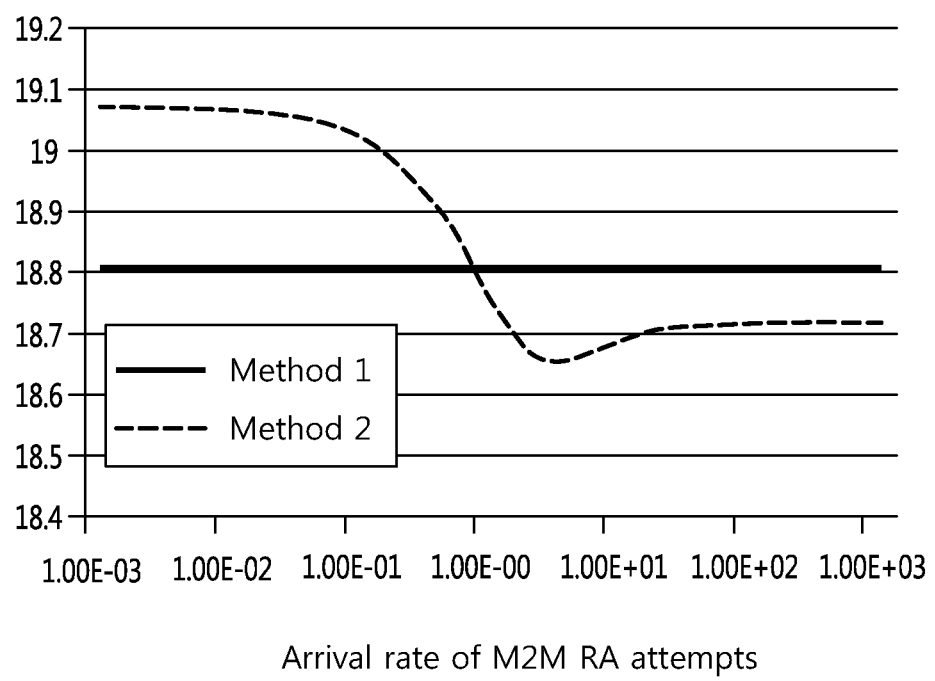
FIG. 26 illustrates RACH throughput of Method 1 and Method 2 when arrival rate of H2H RA attempts is set to 40.
Figure 27:
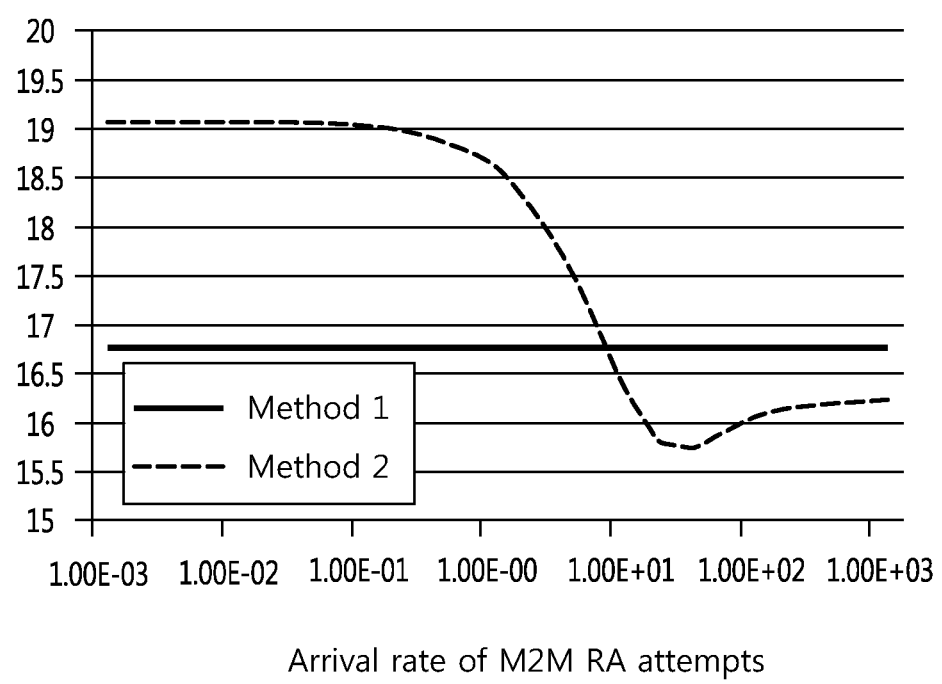
FIG. 27 illustrates another RACH throughput of Method 1 and Method 2 when arrival rate of H2H RA attempts is set to 40.

FIGS. 26-27 illustrate RACH throughput where an arrival rate of 142H UEs' RA attempts is set to 40. A variable m indicating the number of preambles used for M2M UEs in Method 1 is set to 1 and 8 in FIGS. 26 and 27, respectively.

Figure 28:
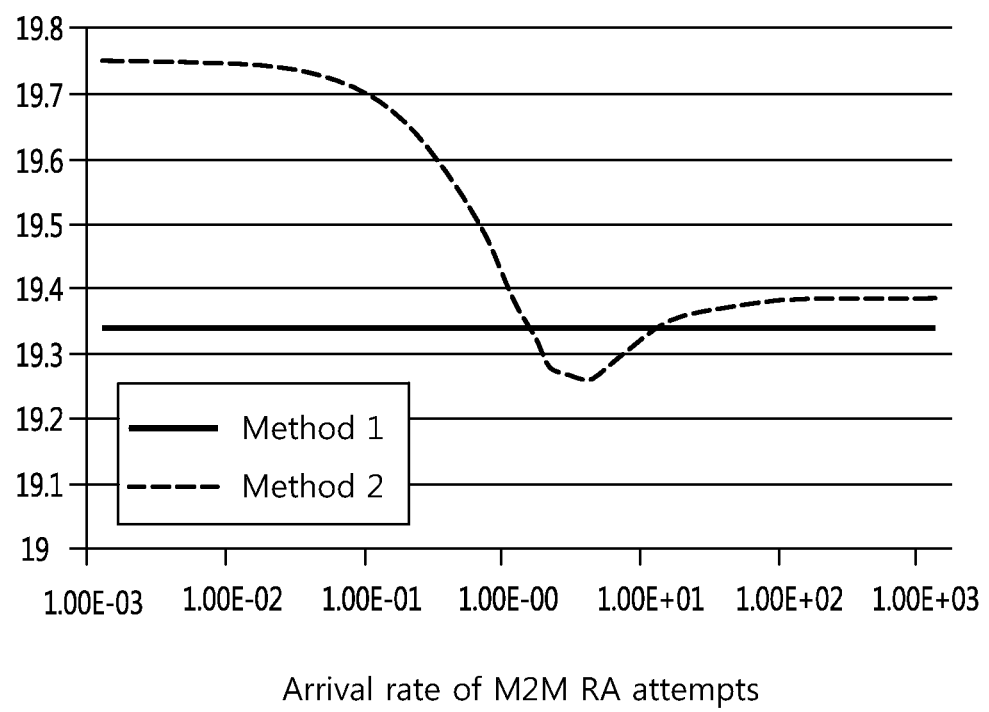
FIG. 28 illustrates RACH throughput of Method 1 and Method 2 when arrival rate of H2H RA attempts is set to 60.
Figure 29:
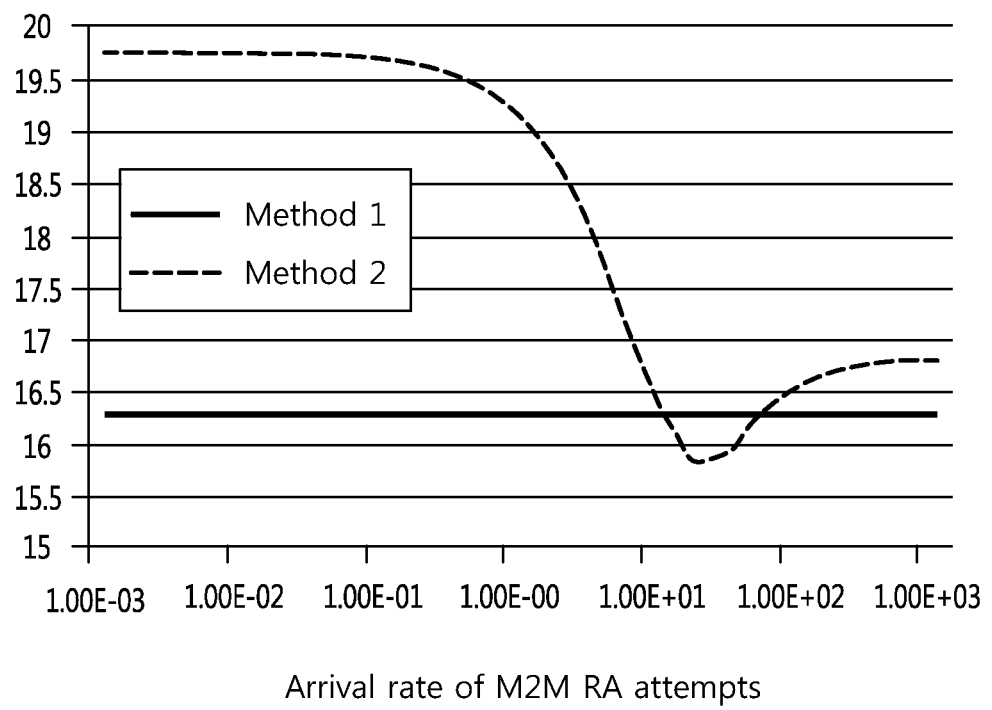
FIG. 29 illustrates another RACH throughput of Method 1 and Method 2 when arrival rate of H2H RA attempts is set to 60.

FIGS. 28-29 illustrate RACH throughput where an arrival rate of H2H UEs' RA attempts is set to 60. A variable m indicating the number of preambles used for M2M UEs in Method 1 is set to 1 and 8 in FIGS. 28 and 29, respectively.

In each example, a variable x indicating the number of preambles commonly used for H2H and M2M UEs in Method 2 is determined to correspond to the variable in used for M2M UEs in Method 1 such that M2M UEs in Method 2 experience the same level of throughput as M2M UEs in Method 1. Generally, the variable x is determined to be greater than the variable m.

The examples presented in FIGS. 20-29 demonstrate the throughput behavior of Method 1 and Method 2 in an infrequently occurring situation such that the H2H RA attempts are more densely populated than M2M RA attempts. For the practical value of the number of available RACH preambles (denoted by the parameter m) such as 54 (not exceeding 64), the number of RACH preambles dedicatedly assigned to M2M UEs in Method 1 have some effect on the throughput behavior of H2H UEs. However, the sensitivity of throughput change relative to the change of parameter 'm' is negligibly small. In contrast, the throughput behavior of Method 2 is more sensitively affected by the change of 'the arrival rate of H2H RA attempts' as depicted.

In examples of FIGS. 20-29, the throughput of Method 2 is better than that of Method 1 in one condition while Method 1 is better in the other. In such condition, the eNB determines one of Method 1 and Method 2 as a proper RA preamble allocation mode depending on the throughput of each method.

In sum, the eNB determines a preamble allocation mode and a boundary between Zone 1 and Zone 2, which are explained in FIGS. 4-5. In step S650, the eNB includes information on the preamble allocation mode and boundary between Zone 1 and Zone 2 in SIB2 and transmits to UEs.

Although a format of information elements included in SIB2 can be modified, the present description provides an example of information elements included in SIB2 is proposed in context of 'RACH-ConfigCommon' information elements of '3GPP TS 36.331 V10.0.0 (2010-12)' as follows.

```
-- ASN1START
RACH-ConfigCommon ::=        SEQUENCE {
    preambleInfo                         SEQUENCE {
        numberOfRA-Preambles             ENUMERATED {
n4, n8, n12, n16 ,n20, n24, n28,n32, n36, n40, n44, n48, n52,
n56,n60, n64},
        numberOfRA-MTCPreambles          ENUMERATED
{n0, n1, n2, n4, n8, n16, n32, n64},
        preamblesGroupAConfig            SEQUENCE {
            sizeOfRA-PreamblesGroupA     ENUMERATED {
n4, n8, n12, n16 ,n20, n24, n28, n32, n36, n40, n44, n48, n52,
n56, n60},
            messageSizeGroupA            ENUMERATED
{b56, b144, b208, b256},
            messagePowerOffsetGroupB     ENUMERATED {
minusinfinity, dB0, dB5, dB8, dB10, dB12, dB15, dB18},
            ...
        }                                OPTIONAL-- Need OP
    },
    powerRampingParameters               SEQUENCE {
        powerRampingStep                 ENUMERATED
{dB0, dB2,dB4, dB6},
        preambleInitialReceivedTargetPower   ENUMERATED {
    dBm-120, dBm-118, dBm-116, dBm-114, dBm-112, dBm-110,
dBm-108, dBm-106, dBm-104, dBm-102, dBm-100, dBm-98, dBm-96,
dBm-94, dBm-92, dBm-90}
    },
    ra-SupervisionInfo                   SEQUENCE {
        preambleTransMax                 ENUMERATED {
n3, n4, n5, n6, n7, n8, n10, n20, n50, n100, n200},
        ra-ResponseWindowSize            ENUMERATED {
sf2, sf3, sf4, sf5, sf6, sf7, sf8, sf10},
        mac-ContentionResolutionTimer    ENUMERATED {
sf8, sf16, sf24, sf32, sf40, sf48, sf56, sf64}
    },
    maxHARQ-Msg3Tx                       INTEGER (1..8),
    ...
    typeOfMethod                         ENUMERATED {
m1, m2, m3, m4,
    },
}
-- ASN1STOP
```

In the aforementioned example, the 'numberOfRA-Preambles' field indicates the number of preambles used for H2H UEs, and the 'numberOfRA-MTCPreambles' field indicates number of preambles dedicatedly allocated or commonly allocated for M2M UEs. The 'typeOfMethod' field indicates a RA preamble allocation mode selected by the eNB. Method 1 may be indicated by a variable m1, and Method 2 may be indicated by a variable m2. Further, variables m3 and m4 may be reserved for future use.

Hereinafter, features of analyzing the RACH throughputs of Method 1 and Method 2 shown in FIGS. 8-29 is further specified. Relevant parameters related to throughput analysis are defined as the following table.

TABLE 1

| Parameter | Value |
|---|---|
| $\lambda_k$ | arrival rate of RA request of Class k (including back-offs), where Class 1 denotes H2H and Class 2 denotes M2M |
| $T_{ij}$ | RACH throughput of Zone j in Method i |
| $T_i$ | RACH throughput of Zone j in Method i ($=\Sigma_j T_{ij}$) |
| R | Number of available RA-RNTI's per unit time |

For the arrival rate of RA attempts γ and the number of RACH opportunities S, the RACH throughput, denoted by T can be modeled as the following equation under the assumption that the arrival process is Poisson.

$$T = (\text{no. } RACH \text{ oppt.}) \cdot (\text{per-opportunity } thrput.) \quad \text{[Equation 1]}$$
$$= S \cdot \left\{ \frac{\gamma}{S} \cdot \exp\left(-\frac{\gamma}{S}\right) \right\}$$
$$= \gamma \cdot \exp\left(-\frac{\gamma}{S}\right)$$

Thus, for Method 1, the RACH throughputs for H2H and M2M are given by the following equation.

$$T_{11} = \lambda_1 \cdot \exp\left\{-\frac{\lambda_1}{(N-m)}\right\}, \quad \text{[Equation 2]}$$
$$T_{12} = \lambda_2 \cdot \exp\left\{-\frac{\lambda_2}{m}\right\},$$

Therefore, the RACH throughput in Method 1 is defined by the following equation.

$$T_1 = T_{11} + T_{12} \quad \text{[Equation 3]}$$
$$= \lambda_1 \cdot \exp\left\{-\frac{\lambda_1}{(N-m)}\right\} + \lambda_2 \cdot \exp\left\{-\frac{\lambda_2}{m}\right\}$$

In method 2, not all the RA attempts from Class 1 (i.e., H2H) are supposed to be use a preamble belonging to Zone 1. Only $$\frac{(N-x)}{N} \cdot 100 \ (\%)$$

of the attempts are to arrive at Zone 1 whereas the others are to arrive at Zone 2 with the attempts from class 2 (i.e., M2M). Thus the arrival rates of RA attempts at Zones 1 and 2 are defined by the following equation, respectively.

$$\gamma_1 = \lambda_1 \cdot \frac{(N-x)}{N} \quad \text{[Equation 4]}$$
$$\gamma_2 = \lambda_1 \cdot \frac{x}{N} + \lambda_2.$$

Therefore, RACH throughputs for Zone 2 are defined by the following equation, respectively.

$$T_{21} = \gamma_1 \cdot \exp\left\{-\frac{\gamma_1}{(N-x)}\right\}, \quad \text{[Equation 5]}$$
$$T_{22} = \gamma_2 \cdot \exp\left\{-\frac{\gamma_2}{x}\right\}.$$

The M2M portion out of the RACH throughput $T_{22}$ is defined by the following equation.

$$T_{22}^{M2M} = \lambda_2 \cdot \exp\left\{-\frac{\gamma_2}{x}\right\} \quad \text{[Equation 6]}$$

However, the H2H portion is defined by the following equation.

$$T_{22}^{H2H} = (\gamma_2 - \lambda_2) \cdot \exp\left\{-\frac{\gamma_2}{x}\right\} \quad \text{[Equation 7]}$$
$$= \lambda_1 \cdot \frac{x}{N} \cdot \exp\left\{-\frac{\gamma_2}{x}\right\}.$$

Hereinafter, features of comparing throughputs and determining the number of preambles used for H2H and M2M. For any given number of preambles assigned to Zone 2 in Method 1, namely for a given m, the number of preambles need for Zone 2 of Method 2 to provide the same RACH throughput for M2M can be denoted by $\chi_{min}$, as defined by the following equation.

$$\chi_{min} = \inf\{\chi : T_{22}^{M2M}(\chi) = T_{12}\} \quad \text{[Equation 8]}$$

In the equation, $T_{22}^{M2M}$ is represented as a function of x, and $T_{12}$ is a scalar for a given value of m. The number $\chi_{min}$ can be defined by the following equation.

$$x_{min} = \frac{\lambda_2}{\left\{\frac{\lambda_2}{m} - \frac{\lambda_1}{N}\right\}} \quad \text{[Equation 9]}$$
$$= m \cdot \frac{1}{1 - \frac{m}{cN}} \ (> m),$$
$$\text{where } c = \frac{\lambda_2}{\lambda_1}.$$

More generally, if a stringent requirement that the RACH throughput for M2M should not be less than a certain threshold value $\eta_T$ is applied, the number of preambles required to meet the requirement is given by the following equation.

$$\chi_{min}^{real} = \inf\{\chi : T_{22}^{M2M}(\chi) \geq \eta_T\} \quad \text{[Equation 10]}$$

The integer solutation for the above equation can simply be obtained by the following equation.

$$\chi_{min}^{int} : \Pi \inf\{\chi : T_{22}^{M2M}(\chi) \geq \eta_T\} \quad \text{[Equation 11]}$$

Assuming that $\chi_{min}$ pre ambles are assigned to Zone 2 in Method 2 so that the M2M RACH throughput in Method 2 is equivalent to that in Method 1, H2H RACH throuputs can be further compared both methods. Since the H2H RACH request are asummed to use one of preambles assigned to both zones, the H2H RACH throughput is given by the following equation.

$$T_2^{H2H} = T_{21} + T_{22}^{H2H} \quad \text{[Equation 12]}$$

The following equation is used to obtain $T_2^{H2H}$.

$$T_{21} = \lambda_1 \left(1 - \frac{x}{N}\right) \cdot \exp\left\{-\frac{\lambda_1}{N}\right\} \quad \text{[Equation 13]}$$

From the above equation, the following equations are further obtained.

$$T_{21}|_{x=x_{min}} = \lambda_1 \left(1 - \frac{1}{\left(\frac{N}{m} - \frac{\lambda_1}{\lambda_2}\right)}\right) \cdot \exp\left\{-\frac{\lambda_1}{N}\right\} \quad \text{[Equation 14]}$$

$$T_{22}^{H2H}|_{x=x_{min}} = \lambda_1 \left(\frac{1}{\left(\frac{N}{m} - \frac{\lambda_1}{\lambda_2}\right)}\right) \cdot \exp\left\{-\frac{\lambda_2}{m}\right\} \quad \text{[Equation 15]}$$

Finally, $T_2^{H2H}$ is obtained as the following equation, and $T_{11}$ and $T_2^{H2H}$ can be compared.

$$T_2^{H2H} = \lambda_1 \left(1 - \frac{1}{\left(\frac{N}{m} - \frac{\lambda_1}{\lambda_2}\right)}\right) \cdot \exp\left\{-\frac{\lambda_1}{N}\right\} + \quad \text{[Equation 16]}$$

$$\lambda_1 \left(\frac{1}{\left(\frac{N}{m} - \frac{\lambda_1}{\lambda_2}\right)}\right) \cdot \exp\left\{-\frac{\lambda_2}{m}\right\}.$$

As discussed above, H2H RACH throughput can be provided as follows:

TABLE 2

| Method | H2H RACH Throughput |
|---|---|
| Method 1 | $\lambda_1 \cdot \exp\left\{-\frac{\lambda_1}{(N-m)}\right\}$ |
| Method 2 | $\lambda_1 \left[(1-\alpha) \cdot \exp\left\{-\frac{\lambda_1}{N}\right\} + \alpha \cdot \exp\left\{-\frac{\lambda_2}{m}\right\}\right]$ |

Note: $\alpha^{-1} = \left(\frac{N}{m} - \frac{\lambda_1}{\lambda_2}\right)$.

As discussed above, the throughput performance of Method 1 and Method 2 depends upon various parameters. In the following examples, it is assumed that the eNB assigns 54 preambles for UE. In particular, in Method 1, it is assumed that H2H UEs can use one of 49 preambles whereas M2M UEs can uses one of the rest (i.e., one of the other preambles). In Method 2, H2H UEs can use one of the 54 preambles whereas M2M UEs can use one of a certain number preambles defined by the foregoing Equation 8.

Figure 30:
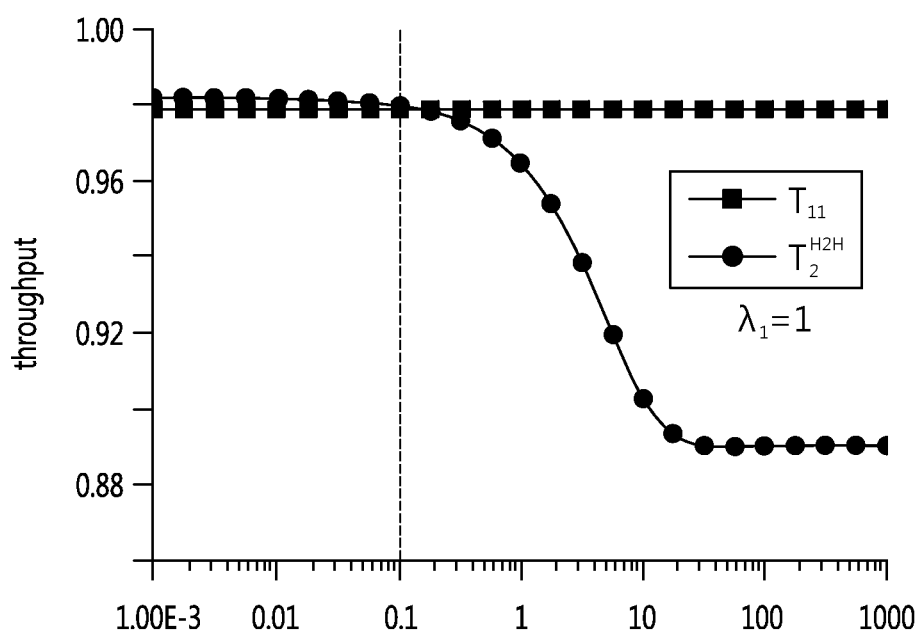
FIG. 30 illustrates RACH throughput of Method 1 and Method 2 when arrival rate of H2H RA attempts is set to 1.
Figure 31:
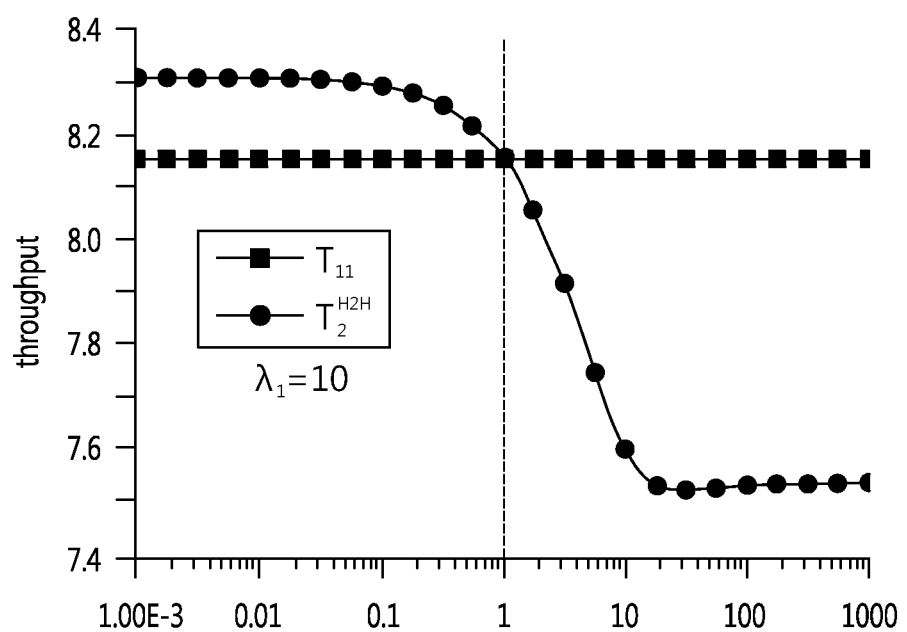
FIG. 31 illustrates RACH throughput of Method 1 and Method 2 when arrival rate of H2H RA attempts is set to 10.
Figure 32:
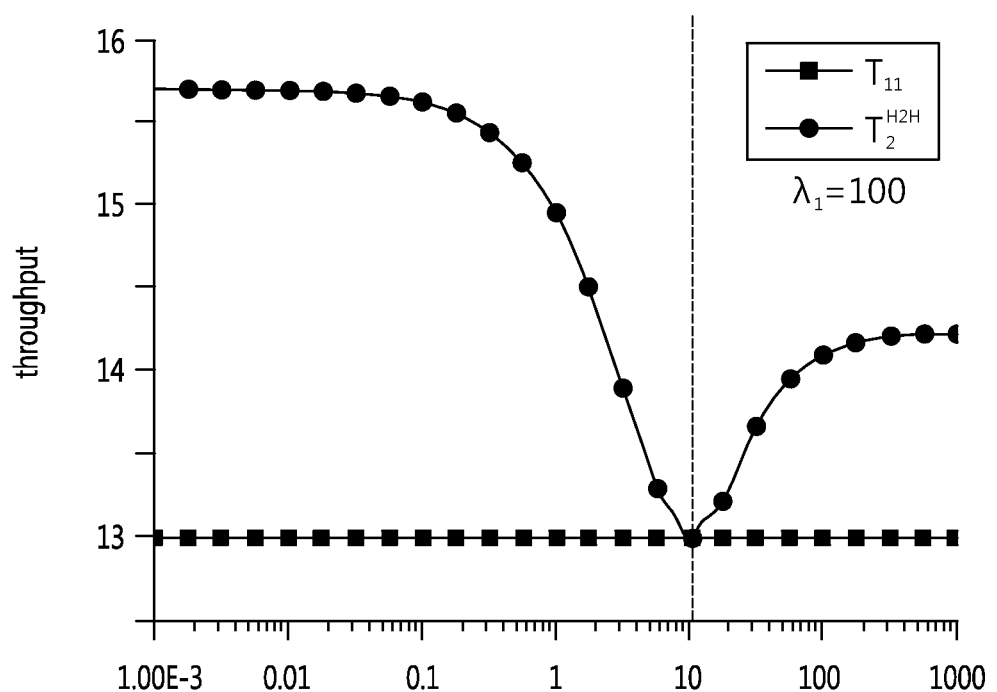
FIG. 32 illustrates RACH throughput of Method 1 and Method 2 when arrival rate of H2H RA attempts is set to 100.

FIGS. 30-32 represent RACH throughput for H2H UEs according to the variation of the arrival rate of RA attempts of M2M UEs. The arrival rate of RA attempts of H2H UEs is 1, 10, and 100 for FIGS. 4, 5, and 6, respectively.

Referring to FIG. 30, when the arrival rate of RA attempts of H2H UEs is set to 1 ($\lambda_1=1$), Method 2 has a slightly better throughput when the arrival rate of M2M RA attempts is smaller than 0.1 (Erlangs). However, it is noted that this method suffers from a degradation in throughput when the arrival rate of M2M RA attempts is greater than 0.1. In case where the AC barring is applied, the variation of arrival rate changes over time due to the Binomial trials observed in the AC barring check procedure.

Referring to FIG. 31, the throughput of Method 2 is approximately 2.5% better than that of Method 1 when $\lambda_2<1$ whereas the throughput of Method 2 is approximately 9% worse than that of Method 1. In the previous two examples where $\lambda_1=1$ and 10, the degradation of throughput is larger than its improvement if Method 2 is applied.

In the example of FIG. 32, a scarce case where the arrival rate of H2H RA attempts is very large, namely, $\lambda_1=100$ is discussed. In this unusual case, Method 2 performs better than Method 1 at all times. Referring to FIG. 6, the throughput of H2H UEs has a valley, namely, the number around $\lambda_2=10$. This is because the overall throughput comprises the throughput in Zone 1 and that in Zone 2, which have different decreasing and increasing behaviors in x as indicated in Equation 16.

Figure 33:
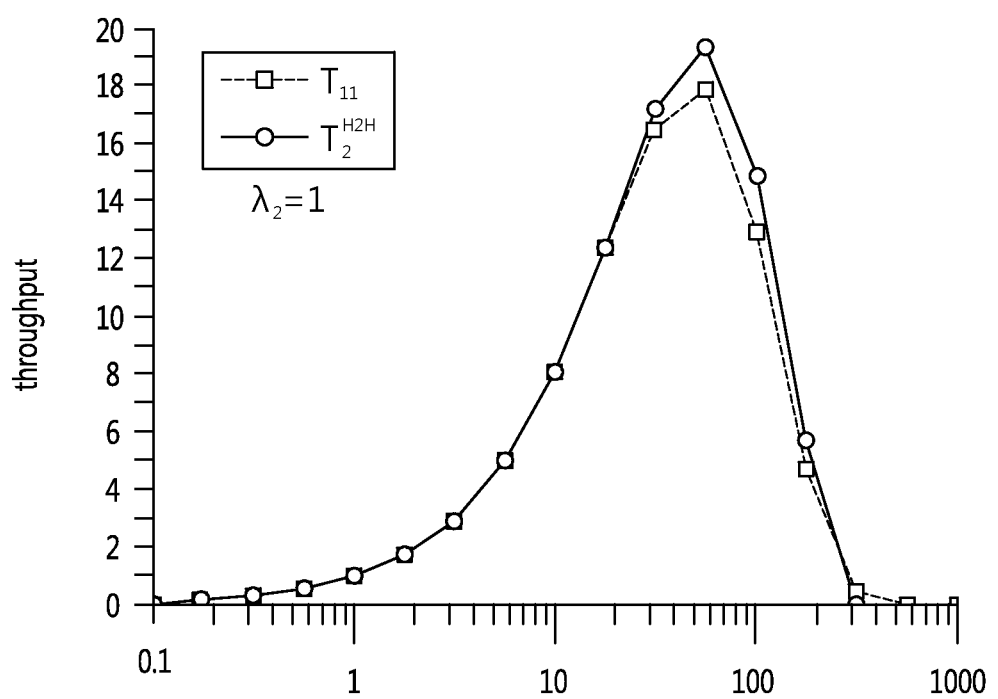
FIG. 33 illustrates RACH throughput of Method 1 and Method 2 when arrival rate of M2M RA attempts is set to 1.
Figure 34:
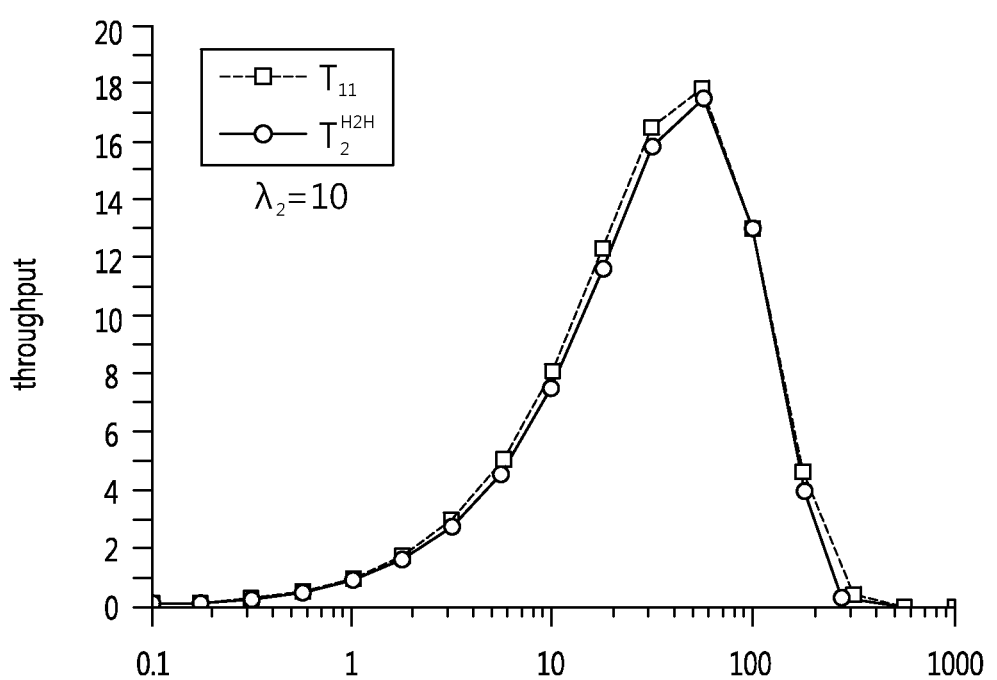
FIG. 34 illustrates RACH throughput of Method 1 and Method 2 when arrival rate of M2M RA attempts is set to 10.
Figure 35:
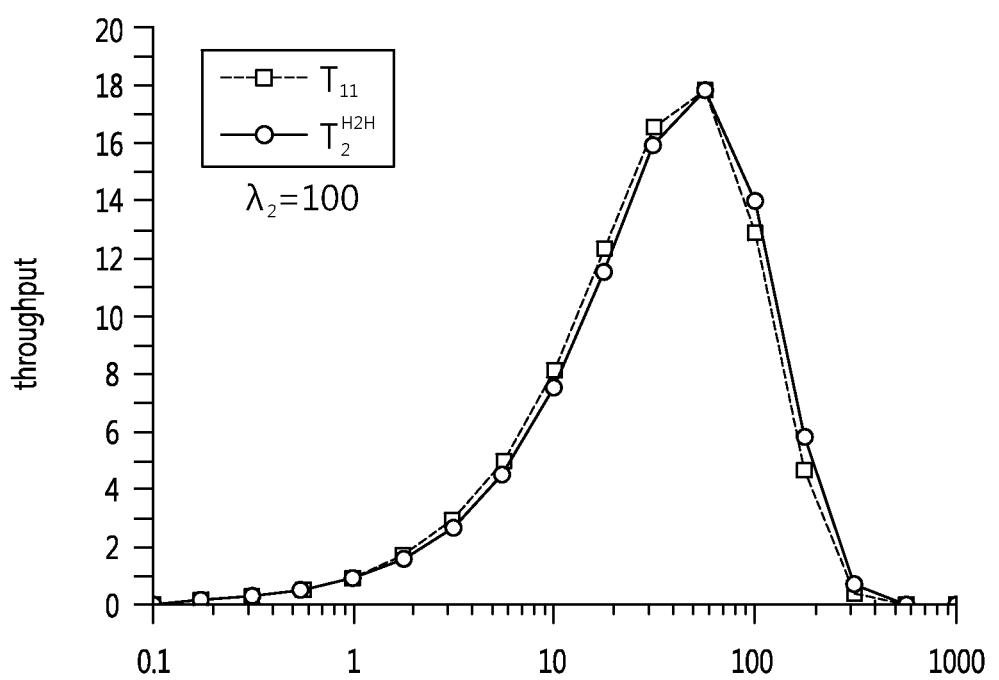
FIG. 35 illustrates RACH throughput of Method 1 and Method 2 when arrival rate of M2M RA attempts is set to 100.

FIGS. 33-35 represent throughput performance according to the variation of the arrival rate of H2H RA attempts when the arrival rate of M2M RA attempts is stationary. Referring to FIGS. 33-35, Method 2 provides throughput performance comparable to or slightly worse than Method 1 when the arrival rate of H2H RA attempts is smaller than 10 (Erlangs), which is a practical case. In FIGS. 33 and 35, Method 2 performs better than Method 1 only when the rate of H2H RA attempts is greater than the rate of M2M RA attempts. However, this is not a practical situation even if it can happen with a low probability.

Figure 36:
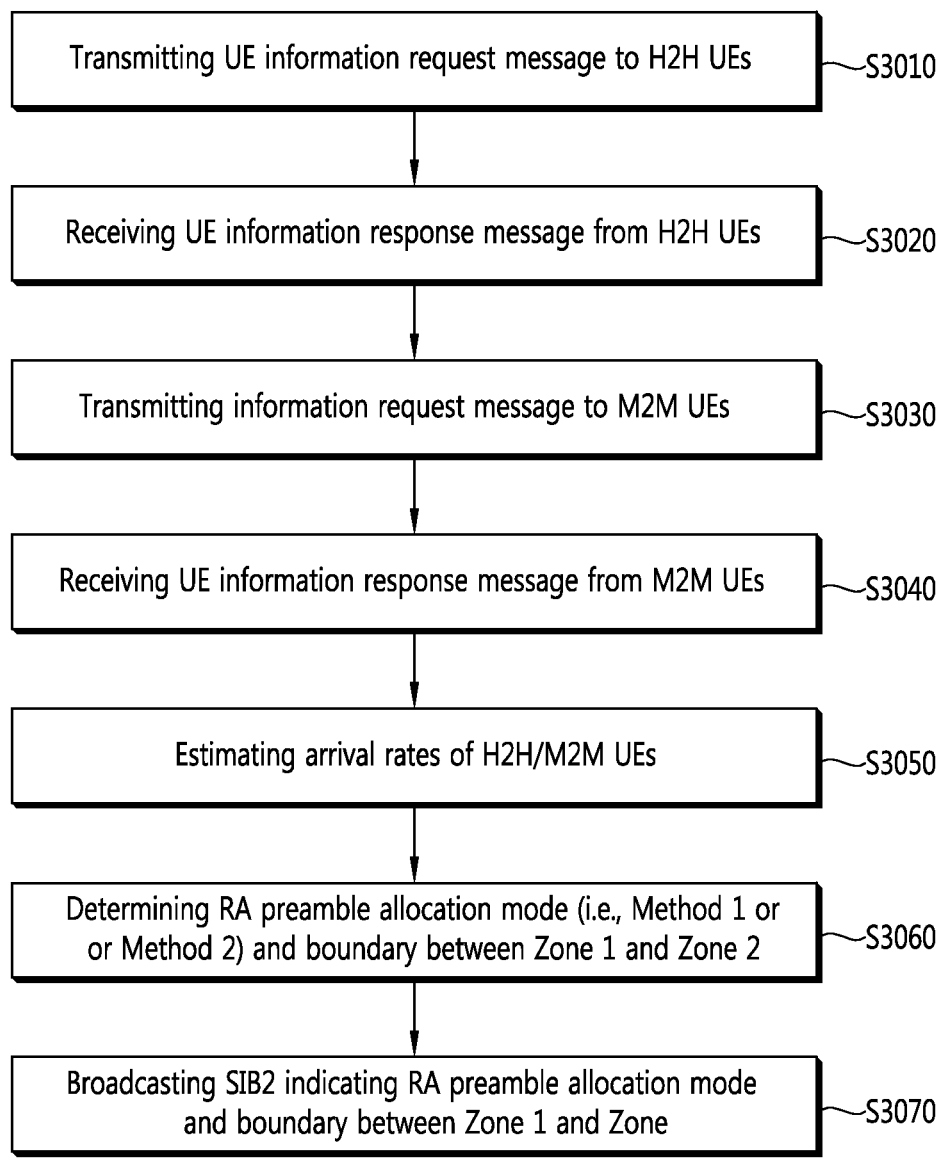
FIG. 36 is a flowchart illustrating a method of instructing a RA preamble allocation mode to the UE.

FIG. 36 is a flowchart showing an example of methods for designating preamble allocation mode. The example of FIG. 36 is applicable to an eNB communicating with H2H UEs and M2M UEs. In steps S3010-S3020, the eNB transmits UE information request messages to H2H UEs and thereafter receives an UE information response messages from the H2H UEs. The UE information response messages may include information on the number of preambles sent by the H2H UEs during the last successfully completed random access procedure.

In steps S3030-S3040, the eNB transmits UE information request messages to M2M UEs and thereafter receives an UE information response messages from the M2M UEs. The UE information response messages may include information on the number of preambles sent by the M2M UEs during the last successfully completed random access procedure.

In steps S3050-S3060, the eNB estimates the first arrival rate for H2H RA attempts and the second arrival rate for M2M RA attempts, and thereafter determines RA preamble allocation mode (i.e., Method 1 or Method 2) and boundary between Zone 1 and Zone 2 based on arrival rates. As discussed above, the RA preambles are allocated to H2H UEs and M2M UEs without overlap in Method 1 whereas Method 2 allows partial overlap.

Finally, in step S3070, the eNB includes information on allocation mode and the number of preambles for H2H or M2M communication in the SIB2 and broadcast it to UEs.

The specific order of steps depicted in FIG. 36 is shown for exemplary purposes. Therefore, the method for designating preamble allocation mode in the present description is not limited thereto.

Figure 37:
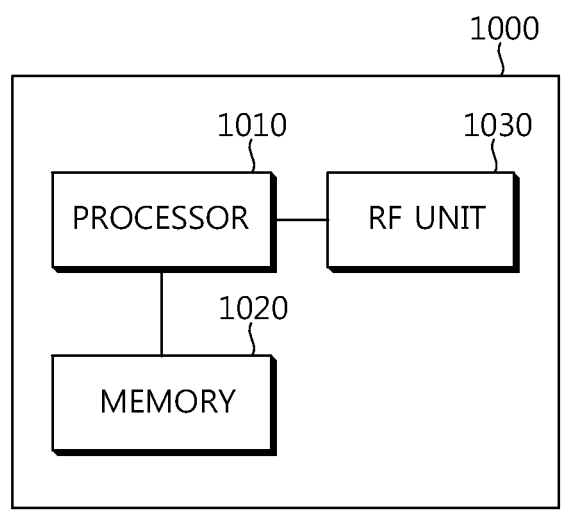
FIG. 37 is a block diagram showing a wireless apparatus to implement technical features of this description.

FIG. 37 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related determining RA preamble allocation mode. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of determining a random access preamble in a wireless communication system, the method performed by a base station (BS) and comprising:
    transmitting a first UE information request message to a first type user equipment (UE);
    receiving, in response to the first UE information request message, a first UE information response message from the first type UE, the first UE information response message indicating a number of preambles sent by the first type UE during a last successfully completed random access procedure;
    transmitting a second UE information request message to a second type user equipment (UE) different from the first type UE;
    receiving, in response to the second UE information request message, a second UE information response message from the second type UE, the second UE information response message indicating a number of preambles sent by the second type UE during a last successfully completed random access procedure;
    estimating a first arrival rate for the first type UE and a second arrival rate for the second type UE;
    determining a random access preamble allocation mode based on the first and second arrival rates, wherein available random access preamble allocation modes include a first allocation mode in which the random access preambles are allocated to the first type UE and the second type UE without overlap and a second allocation mode in which the random access preambles are allocated to the first type UE and the second type UE with partial overlap, wherein a number of random access preambles allocated to the first type UE and a number of random access preambles allocated to the second type UE are determined based on the first and second arrival rates; and
    broadcasting a radio resource control (RRC) message including a first information element and a second information element, wherein the first information element indicates the determined random access preamble allocation mode, and the second information element indicates the number of random access preambles allocated to the first type UE and the number of random access preambles allocated to the second type UE.

2. The method of claim 1, wherein the first type UE is associated with human-to-human communication, and the second type UE is associated with machine-to-machine communication.

3. The method of claim 1, wherein the RRC message is a system information block type 2 (SIB2).

4. The method of claim 1, wherein the first and the second UE information request messages are transmitted by an RRC of the BS.

5. The method of claim 1, wherein the first arrival rate is estimated based on a mean value of the number of preambles sent by the first type UE.

6. The method of claim 1, wherein the first arrival rate is estimated further based on success probability of preamble transmission.

7. A base station for determining a random access preamble in a wireless communication system comprising:
    a processor configured for:
        transmitting a first UE information request message to a first type user equipment (UE);
        receiving, in response to the first UE information request message, a first UE information response message from the first type UE, the first UE information response message indicating a number of preambles sent by the first type UE during a last successfully completed random access procedure;
        transmitting a second UE information request message to a second type user equipment (UE) different from the first type UE;
        receiving, in response to the second UE information request message, a second UE information response message from the second type UE, the second UE information response message indicating a number of preambles sent by the second type UE during a last successfully completed random access procedure;
        estimating a first arrival rate for the first type UE and a second arrival rate for the second type UE;
        determining a random access preamble allocation mode based on the first and second arrival rates, wherein available random access preamble allocation modes include a first allocation mode in which the random access preambles are allocated to the first type UE and the second type UE without overlap and a second allocation mode in which the random access preambles are allocated to the first type UE and the second type UE with partial overlap, wherein a number of random access preambles allocated to the first type UE and a number of random access preambles allocated to the second type UE are determined based on the first and second arrival rates; and broadcasting a radio resource control (RRC) message including a first information element and a second information element, wherein the first information element indicates the determined random access preamble allocation mode, and the second information element indicates the number of random access preambles allocated to the first type UE and the number of random access preambles allocated to the second type UE.

8. The base station of claim 7, wherein the first type UE is associated with human-to-human communication, and the second type UE is associated with machine-to-machine communication.

9. The base station of claim 7, wherein the RRC message is a system information block type 2 (SIB2).

10. The base station of claim 7, wherein the first and the second UE information request messages are transmitted by an RRC of the BS.

11. The base station of claim 7, wherein the first arrival rate is estimated based on a mean value of the number of preambles sent by the first type UE.

12. The base station of claim 7, wherein the first arrival rate is estimated further based on success probability of preamble transmission.

* * * * *